(12) United States Patent
Pratt

(10) Patent No.: US 8,398,345 B2
(45) Date of Patent: Mar. 19, 2013

(54) LOW PROFILE DUAL-ACTION DISPOSABLE CLAMP

(75) Inventor: John D. Pratt, Laguna Niguel, CA (US)

(73) Assignee: Monogram Aerospace Fasteners, Inc., Los Angeles, CA (US)

( * ) Notice: Subject to any disclaimer, the term of this patent is extended or adjusted under 35 U.S.C. 154(b) by 357 days.

(21) Appl. No.: 12/843,465

(22) Filed: Jul. 26, 2010

(65) Prior Publication Data

US 2010/0327505 A1  Dec. 30, 2010

Related U.S. Application Data

(63) Continuation of application No. PCT/US2010/042317, filed on Jul. 16, 2010, and a (Continued)

(51) Int. Cl.
*F16B 13/06* (2006.01)
(52) U.S. Cl. .............................. 411/39; 411/34; 411/55
(58) Field of Classification Search ................... 411/1–5, 411/34, 38, 39, 42, 43, 55, 999
See application file for complete search history.

(56) References Cited

U.S. PATENT DOCUMENTS

| | | | |
|---|---|---|---|
| 612,316 A | 10/1898 | Downes | |
| 748,078 A * | 12/1903 | Kaisling | 292/251 |
| 2,282,711 A | 5/1942 | Eklund | |
| 2,763,314 A | 9/1956 | Gill | |
| 2,863,351 A | 12/1958 | Vaughn | |
| 2,915,934 A * | 12/1959 | La Torre | 411/45 |
| 2,971,425 A | 2/1961 | Blakeley | |
| 3,085,463 A | 4/1963 | Lay | |

(Continued)

FOREIGN PATENT DOCUMENTS

| | | |
|---|---|---|
| DE | 20 2006 012 668 | 11/2006 |
| EP | 1889688 | 2/2008 |

(Continued)

OTHER PUBLICATIONS

International Search Report and Written Opinion from PCT/US2010/028832.

(Continued)

*Primary Examiner* — Flemming Saether
(74) *Attorney, Agent, or Firm* — Woodard, Emhardt, Moriarty, McNett & Henry LLP

(57) ABSTRACT

Disclosed is a clamp that includes a bolt, a spacer, a shank, an expander and a blocking means. The bolt includes a non-threaded undercut that permits the bolt to rotate in an internally threaded portion of the spacer without threaded engagement between the bolt and the spacer. When used as a clamp, the spacer, shank, expander and blocking means cooperate to deform the expander into a blind side flange and to clamp a work piece between the flange and the spacer. To remove the clamp, the bolt is moved away from the spacer while rotating the bolt in the expander to bring the external threads of the expander into threaded engagement with the internal threads of the spacer. This permits the extraction of the bolt from the blind side expander by maintaining rotational restraint of the expander with the spacer. In several embodiments, a compression spring is positioned between the head of the bolt and the spacer to automatically move the bolt when it is rotated in a loosening direction.

26 Claims, 23 Drawing Sheets

Related U.S. Application Data continuation-in-part of application No. 12/098,857, filed on Apr. 7, 2008, which is a continuation-in-part of application No. 11/973,278, filed on Oct. 5, 2007.

(60) Provisional application No. 61/226,358, filed on Jul. 17, 2009, provisional application No. 60/849,515, filed on Oct. 5, 2006, provisional application No. 60/857,700, filed on Nov. 8, 2006, provisional application No. 60/901,171, filed on Feb. 13, 2007.

(56) References Cited

U.S. PATENT DOCUMENTS

| | | | |
|---|---|---|---|
| 3,236,143 A | | 2/1966 | Wing |
| 3,345,900 A | | 10/1967 | Villo |
| 3,461,771 A | | 8/1969 | Briles |
| 3,505,921 A | | 4/1970 | Wigam |
| 4,015,505 A | | 4/1977 | Murray |
| 4,033,222 A | | 7/1977 | Wilson |
| 4,168,650 A | | 9/1979 | Dahl et al. |
| 4,203,346 A | | 5/1980 | Hall et al. |
| 4,237,768 A | | 12/1980 | Volkmann |
| 4,263,834 A | | 4/1981 | Dudash |
| 4,457,652 A | | 7/1984 | Pratt |
| 4,519,735 A | | 5/1985 | Machtle |
| 4,579,491 A | | 4/1986 | Kull |
| 4,602,902 A | | 7/1986 | Herb |
| 4,714,391 A | | 12/1987 | Bergner |
| 4,747,204 A | | 5/1988 | Pratt |
| 4,772,167 A | | 9/1988 | Beals |
| 4,865,499 A | * | 9/1989 | Lacey ............... 411/34 |
| 4,929,134 A | | 5/1990 | Bergner |
| 4,950,115 A | | 8/1990 | Sadri |
| 4,984,945 A | | 1/1991 | Bergner |
| 4,988,247 A | | 1/1991 | Summerlin |
| 5,030,050 A | | 7/1991 | Auriol et al. |
| 5,152,648 A | | 10/1992 | Pratt |
| 5,213,460 A | * | 5/1993 | Sadri et al. ............ 411/43 |
| 5,498,110 A | | 3/1996 | Stencel et al. |
| 5,569,005 A | | 10/1996 | Milington |
| 5,603,592 A | * | 2/1997 | Sadri et al. ............ 411/34 |
| 5,620,287 A | | 4/1997 | Pratt |
| 5,634,751 A | | 6/1997 | Stencel et al. |
| 5,651,649 A | * | 7/1997 | Sadri et al. ............ 411/34 |
| 5,759,001 A | | 6/1998 | Smith |
| 5,779,410 A | | 7/1998 | Lautenschlager et al. |
| 5,816,761 A | | 10/1998 | Cassatt et al. |
| 5,947,667 A | | 9/1999 | Cassatt et al. |
| 6,007,009 A | | 12/1999 | Sheridan et al. |
| 6,062,783 A | | 5/2000 | Austin |
| 6,224,309 B1 | | 5/2001 | Yamamoto |
| 6,247,883 B1 | * | 6/2001 | Monserratt ............... 411/34 |
| 6,537,005 B1 | * | 3/2003 | Denham ............... 411/42 |
| 6,547,500 B2 | | 4/2003 | Cosenza |
| 6,746,191 B2 | | 6/2004 | Edland |
| 6,868,757 B2 | | 3/2005 | Hufnagl et al. |
| 6,896,460 B2 | | 5/2005 | Enomoto |
| 6,935,821 B2 | | 8/2005 | Bodin |
| 7,681,426 B2 | | 3/2010 | Main et al. |
| 8,075,234 B2 | | 12/2011 | McClure |
| 2002/0146298 A1 | | 10/2002 | Cosenza |
| 2004/0022596 A1 | | 2/2004 | Belanger |
| 2004/0033119 A1 | | 2/2004 | Hufnagl et al. |
| 2005/0123372 A1 | | 6/2005 | Sato |
| 2005/0201845 A1 | | 9/2005 | Keenen |
| 2006/0062650 A1 | | 3/2006 | Keener |
| 2007/0243035 A1 | | 10/2007 | Pratt |
| 2007/0243037 A1 | | 10/2007 | Pratt |
| 2008/0044252 A1 | | 2/2008 | Scheinberger |

FOREIGN PATENT DOCUMENTS

| | | |
|---|---|---|
| WO | WO 01/04499 A2 | 1/2001 |
| WO | WO 2008/045360 A2 | 4/2008 |

OTHER PUBLICATIONS

International Search Report and Written Opinion from PCT/US2010/042317.

Non-Final Office Action received in U.S. Appl. No. 12/098,857 mailed Dec. 3, 2010.

Non-Final Office Action received in U.S. Appl. No. 11/973,278 mailed Oct. 28, 2010.

Non-Final Office Action received in U.S. Appl. No. 11/973,278 mailed Nov. 8, 2010.

International Search Report from PCT/US2009/039083.

International Search Report from PCT/US2008/080114.

Extended European Search Report from EP07839322.0 filed Oct. 5, 2007.

Non-Final Office Action received in related U.S. Appl. No. 11/973,278 dated May 25, 2011.

* cited by examiner

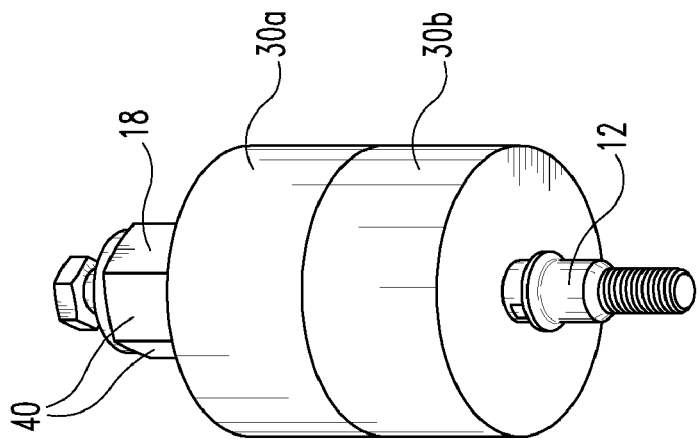
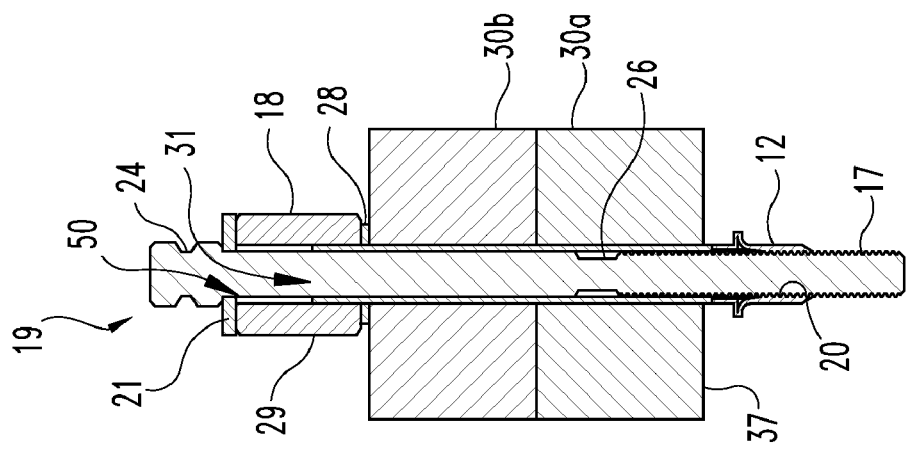
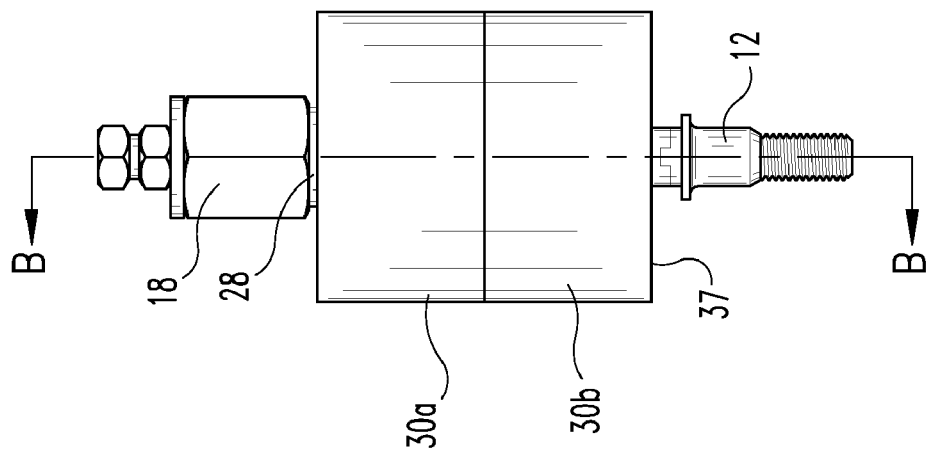

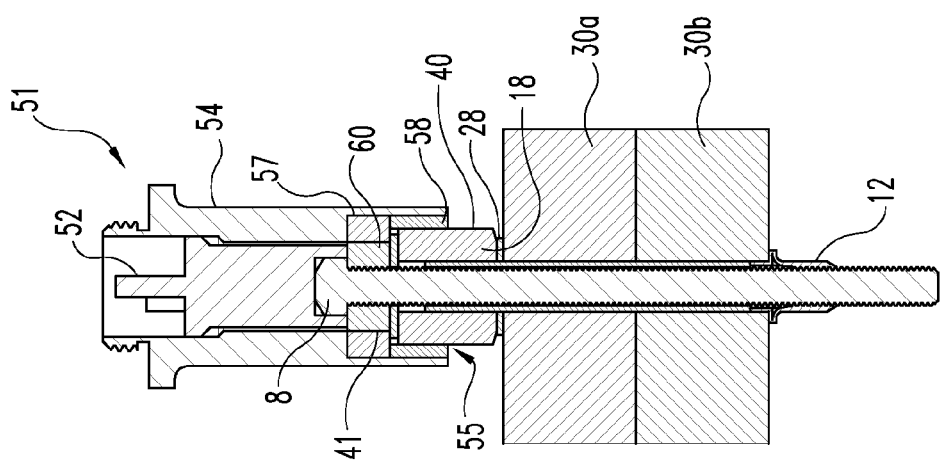
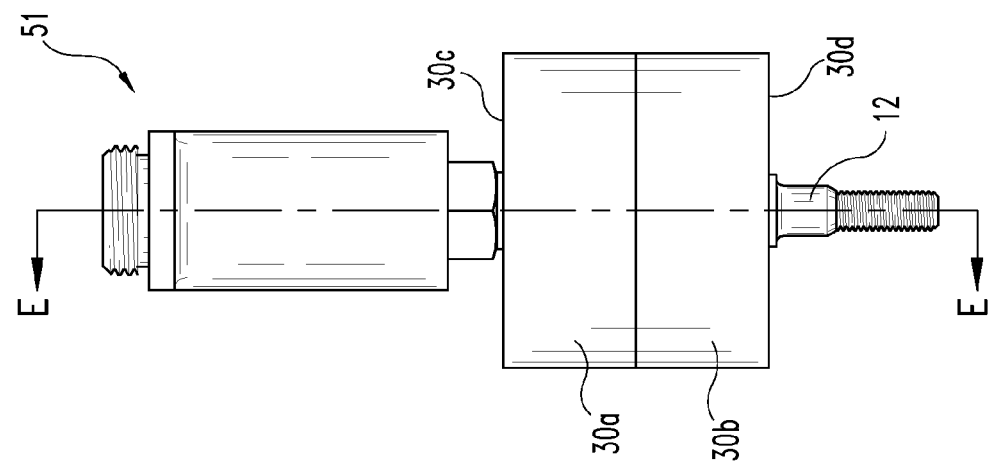
Fig. 5B
Fig. 5A

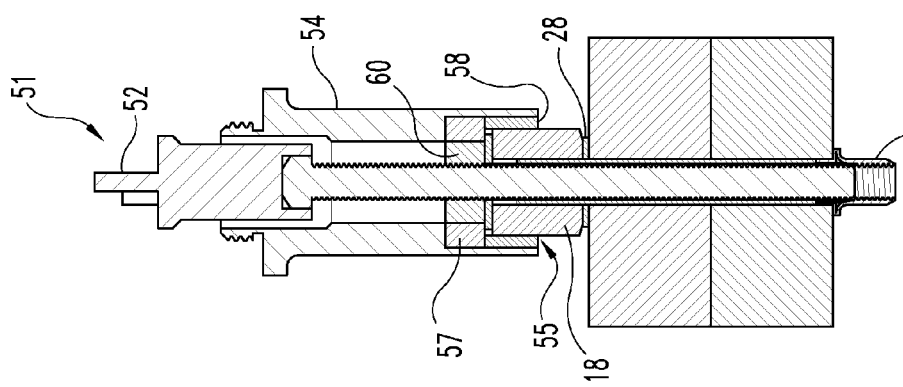
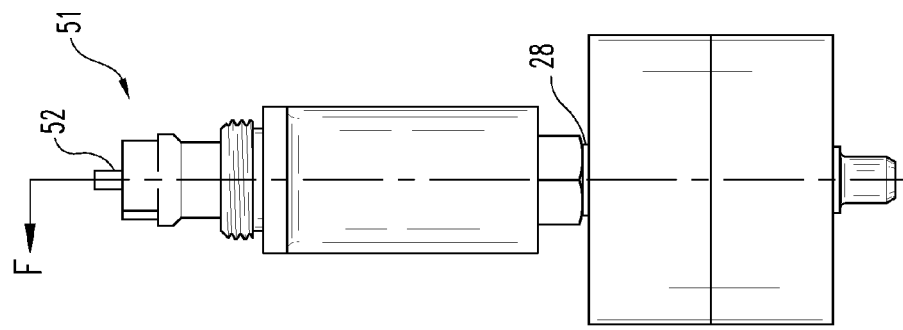

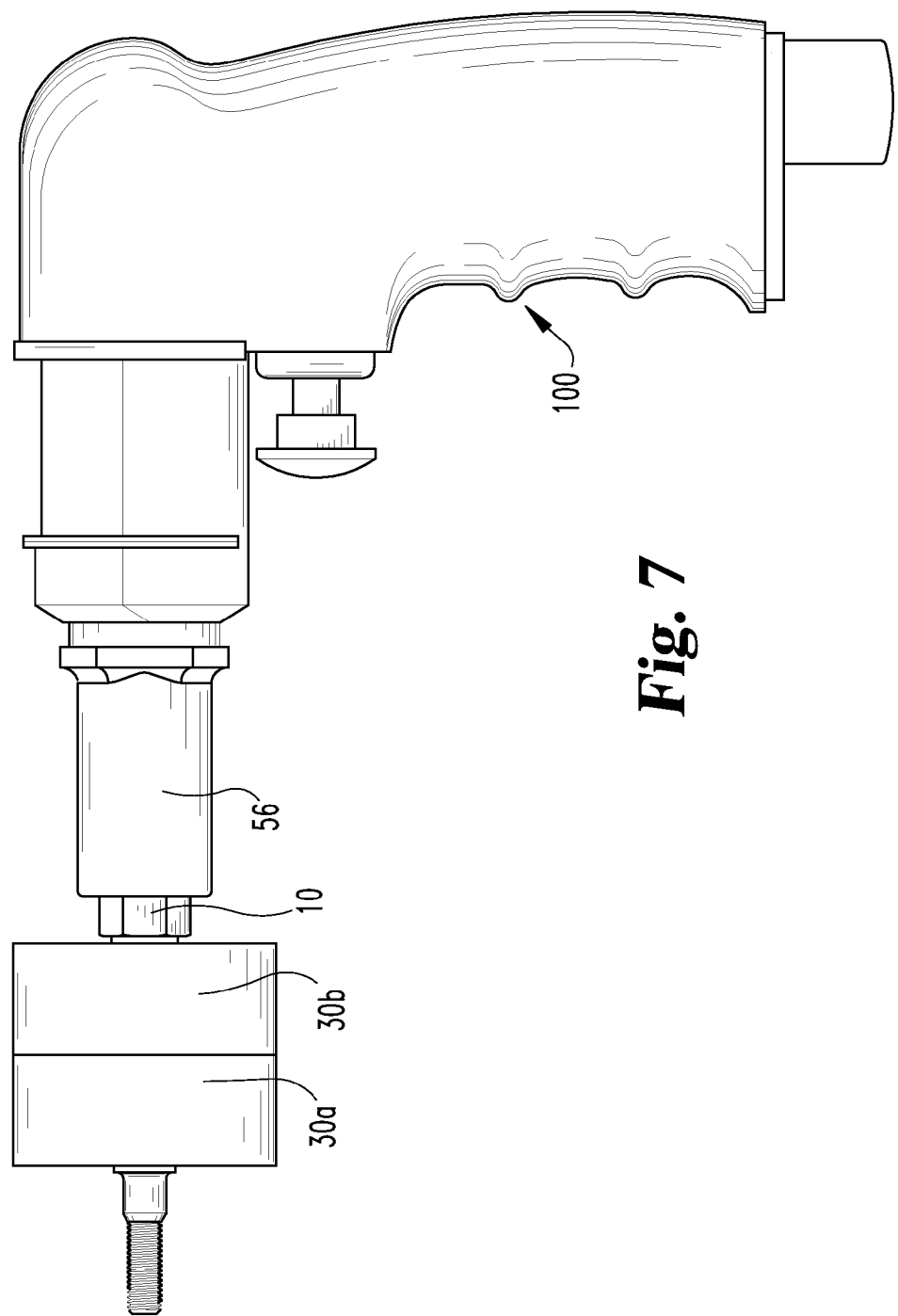

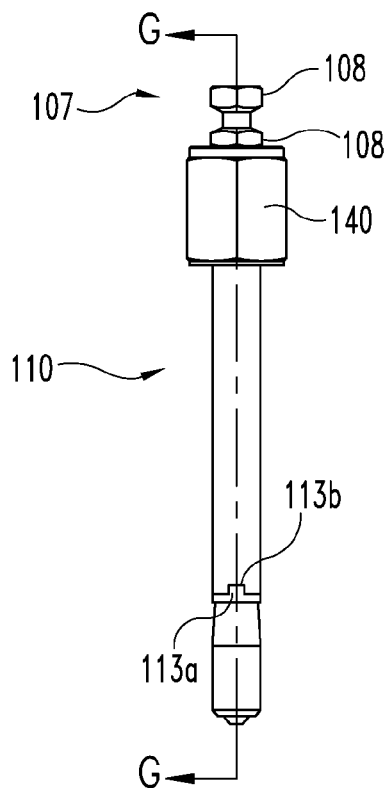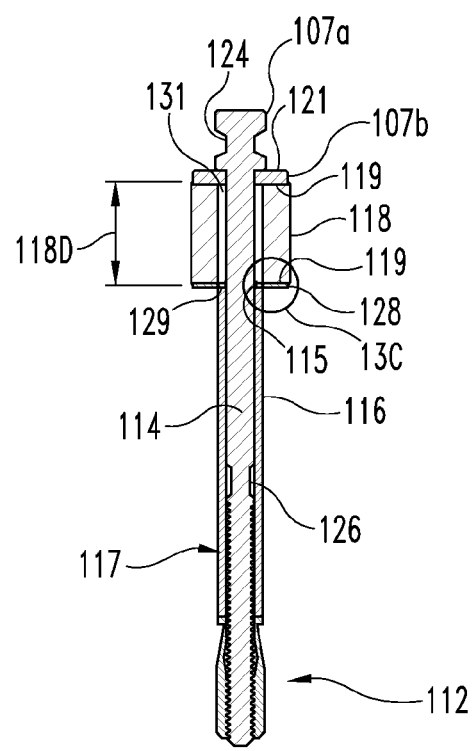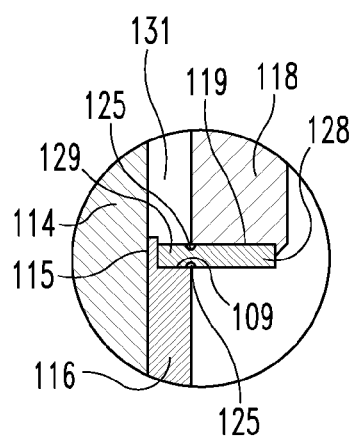
Fig. 13A
Fig. 13B
Fig. 13C

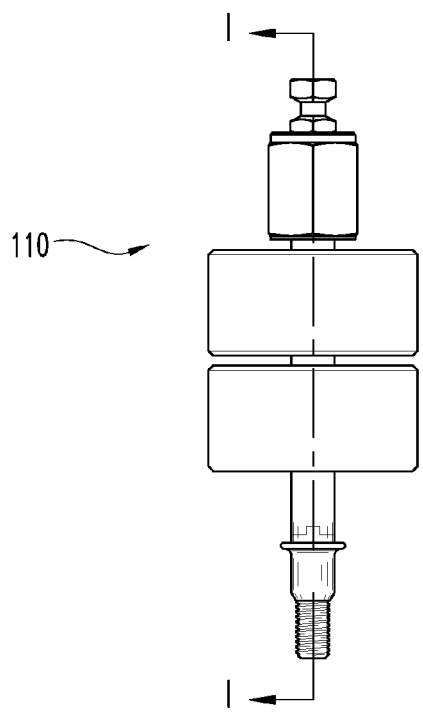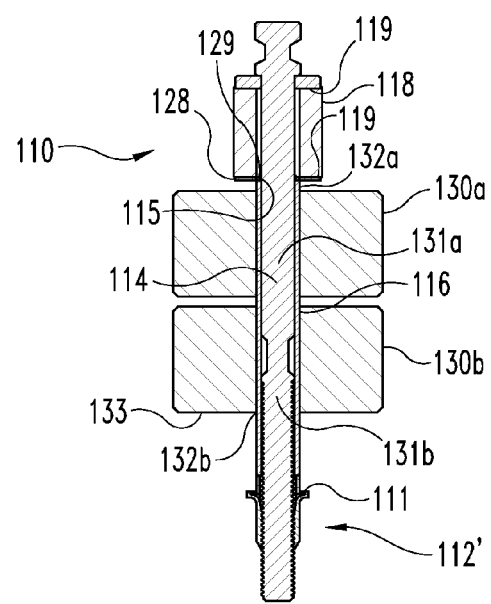
*Fig. 14A*  *Fig. 14B*
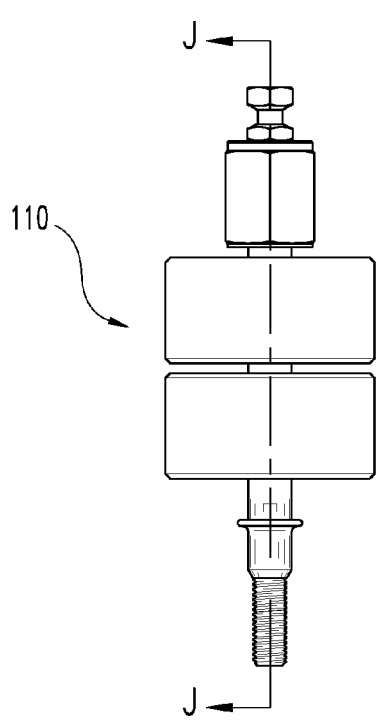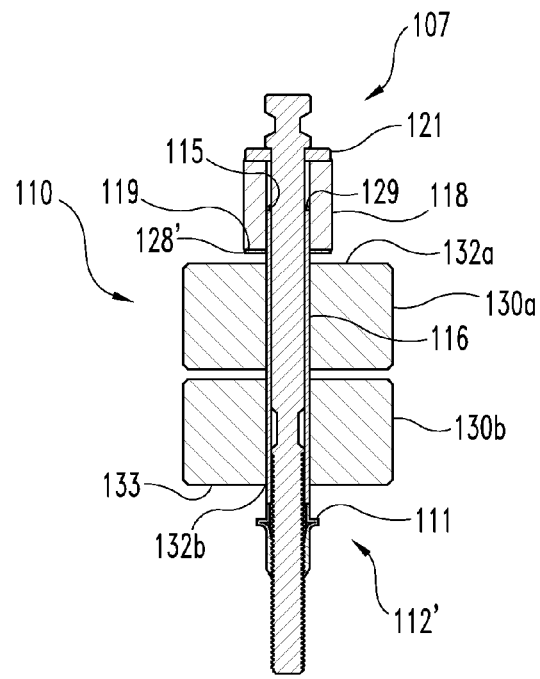
*Fig. 15A*  *Fig. 15B*

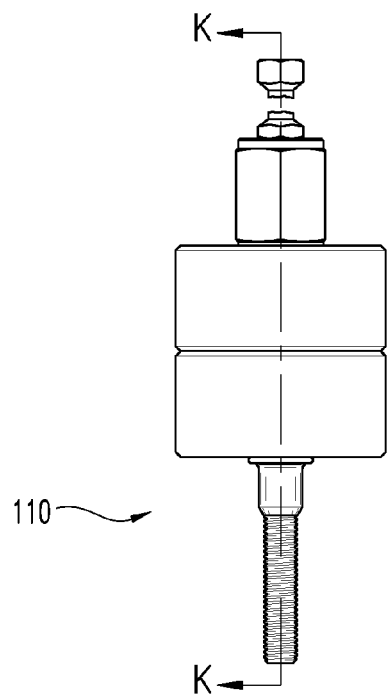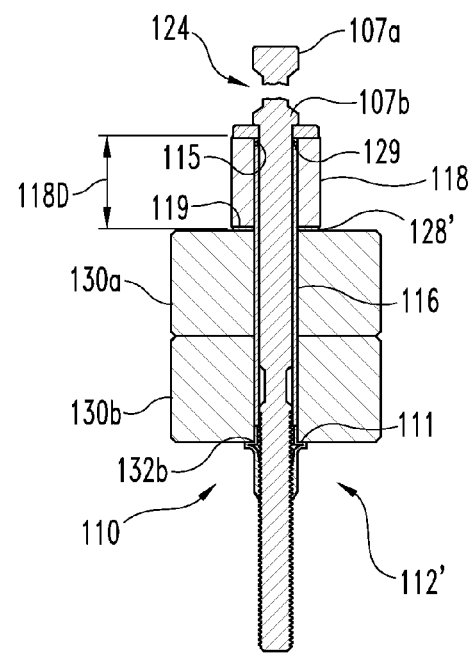
*Fig. 16A*  *Fig. 16B*
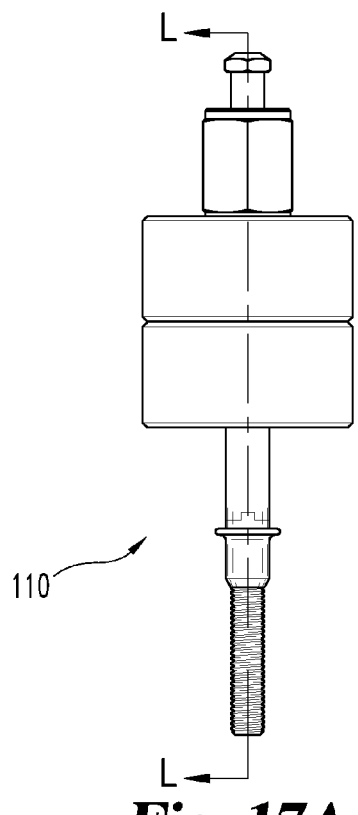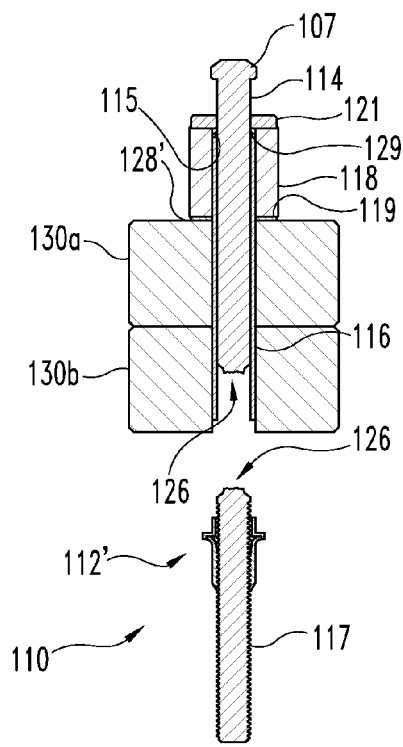
*Fig. 17A*  *Fig. 17B*

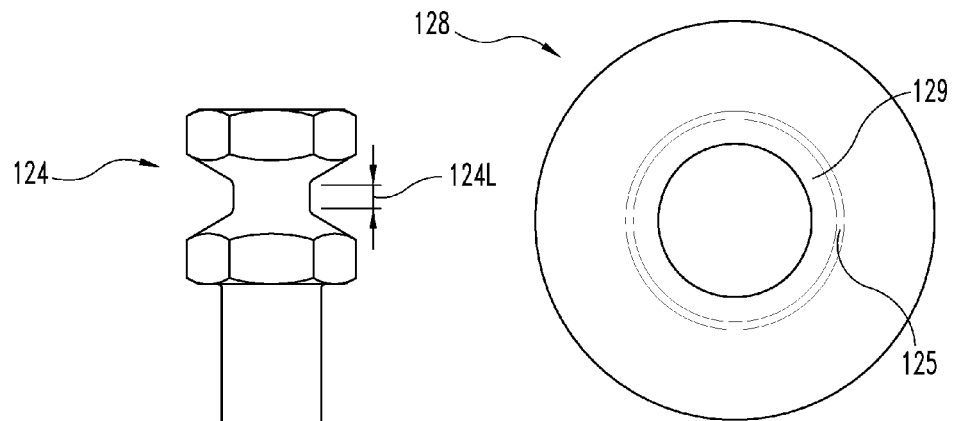
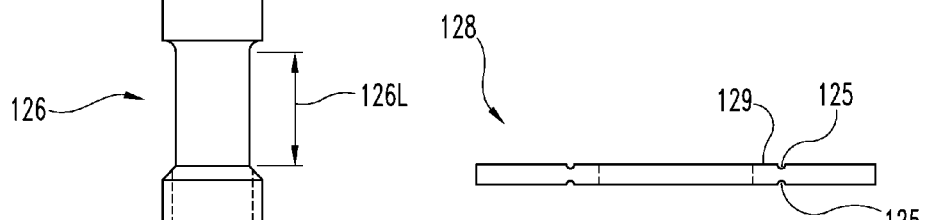
*Fig. 20*
*Fig. 21*
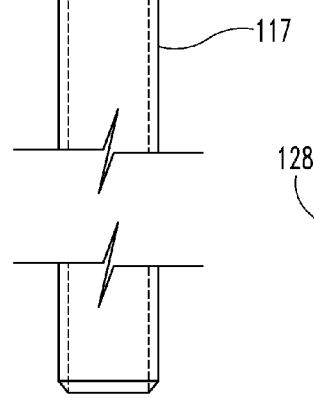
*Fig. 19*
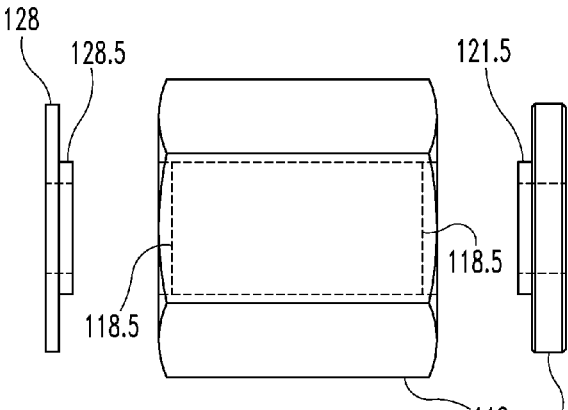
*Fig. 22*

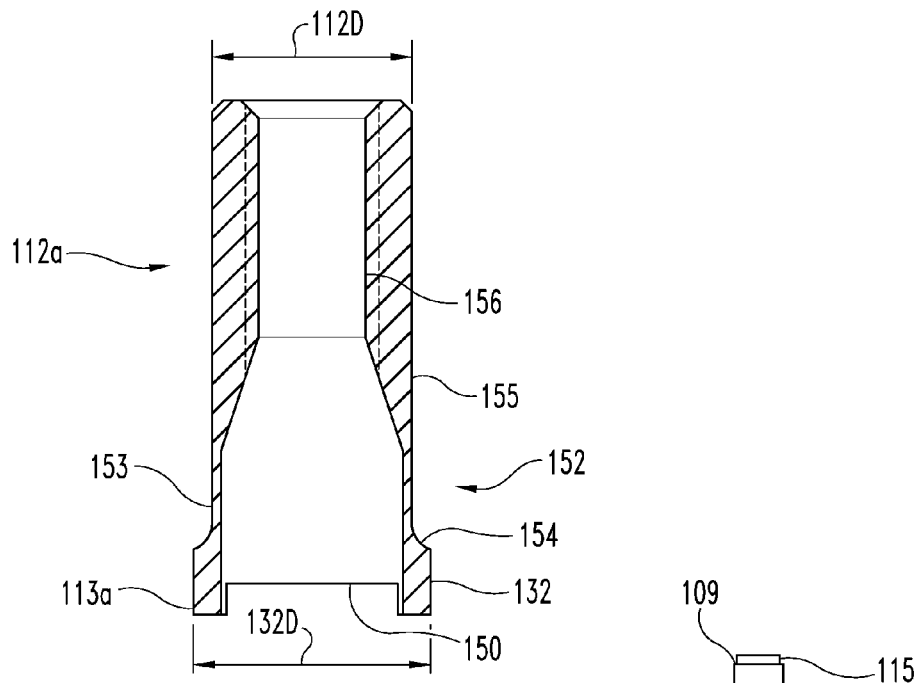
Fig. 23
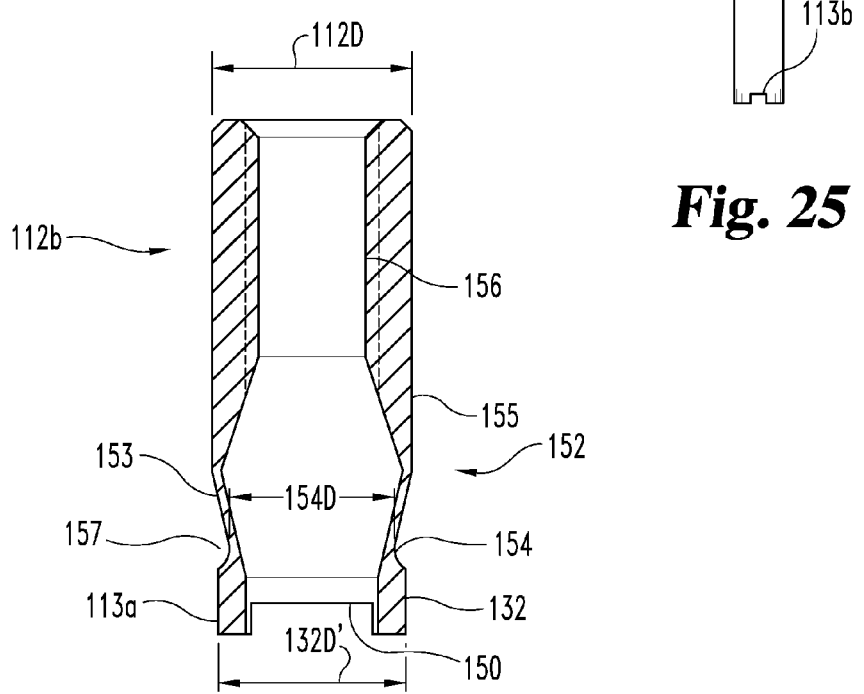
Fig. 25
Fig. 24

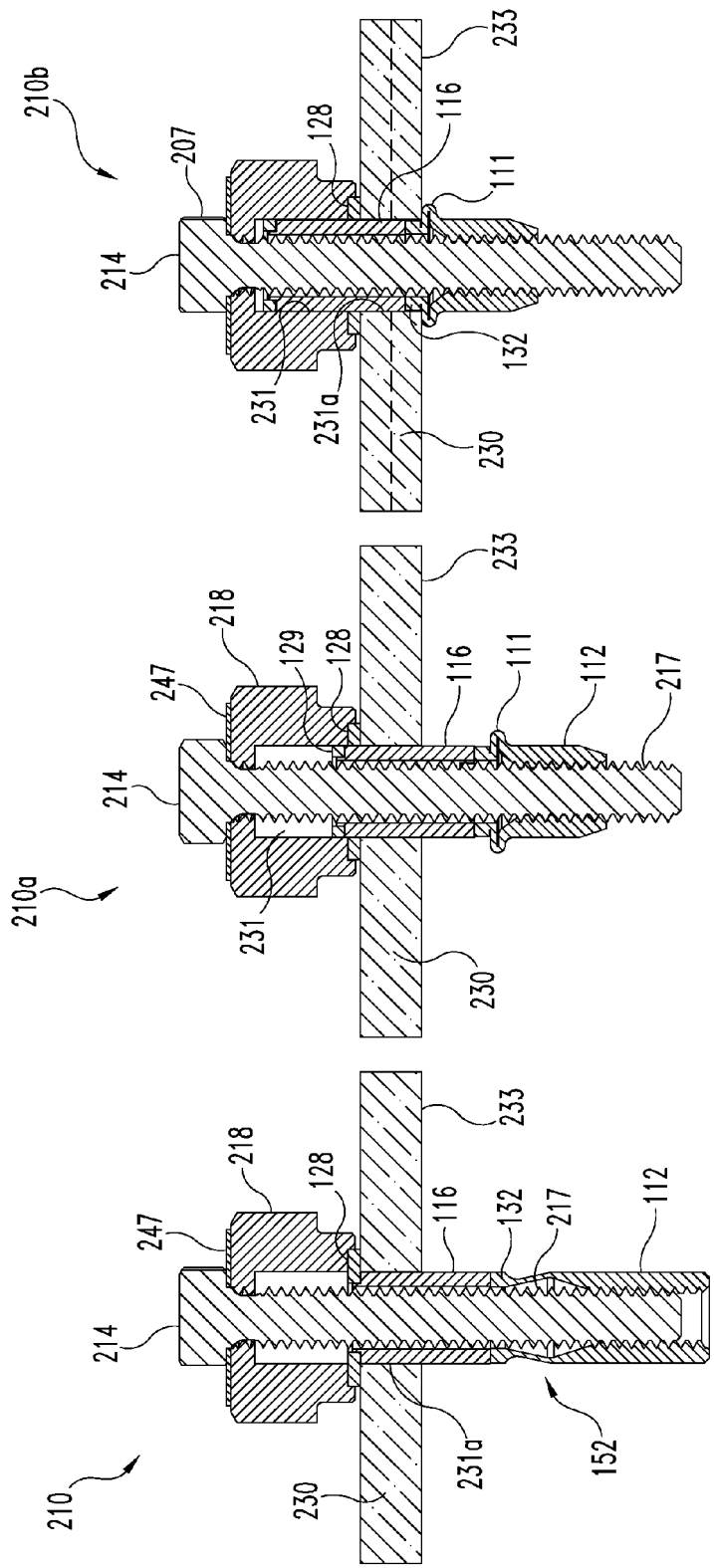

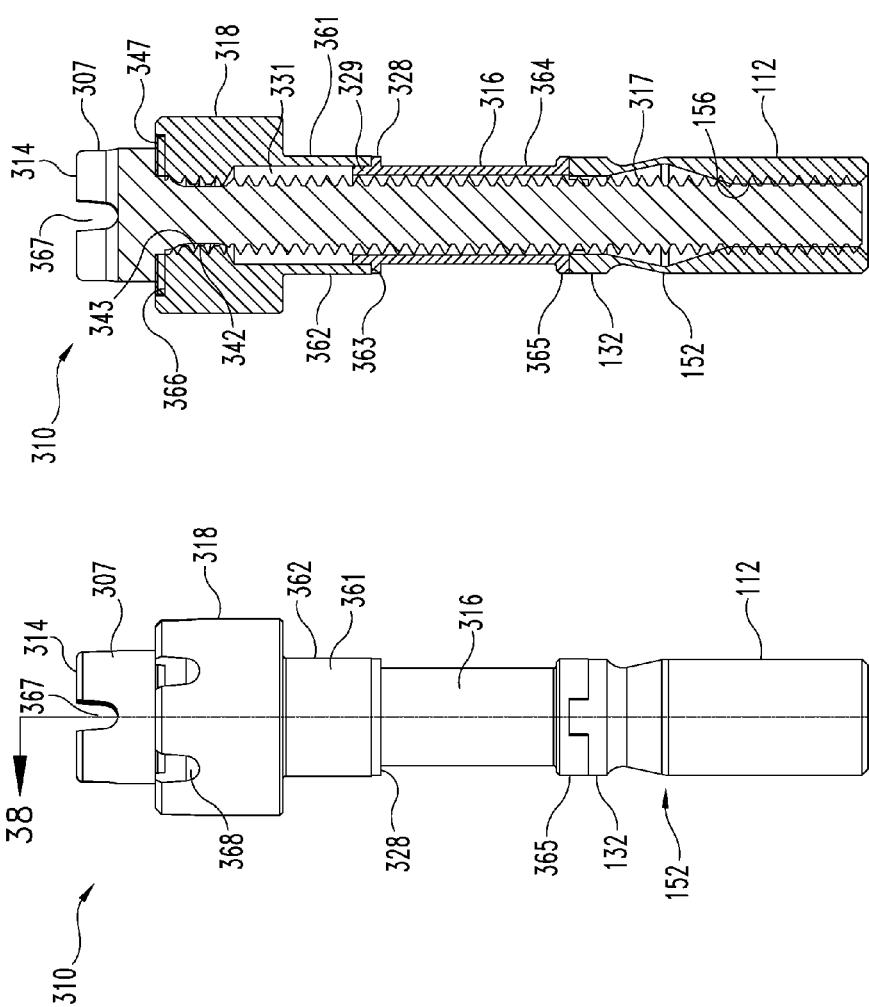

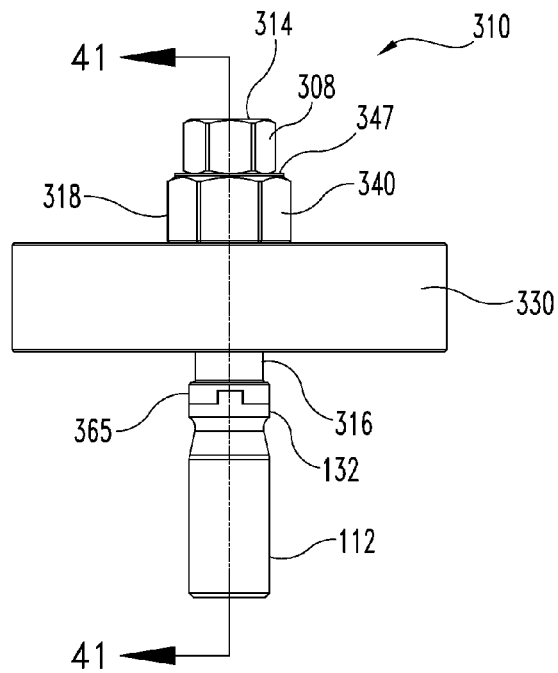
Fig. 40
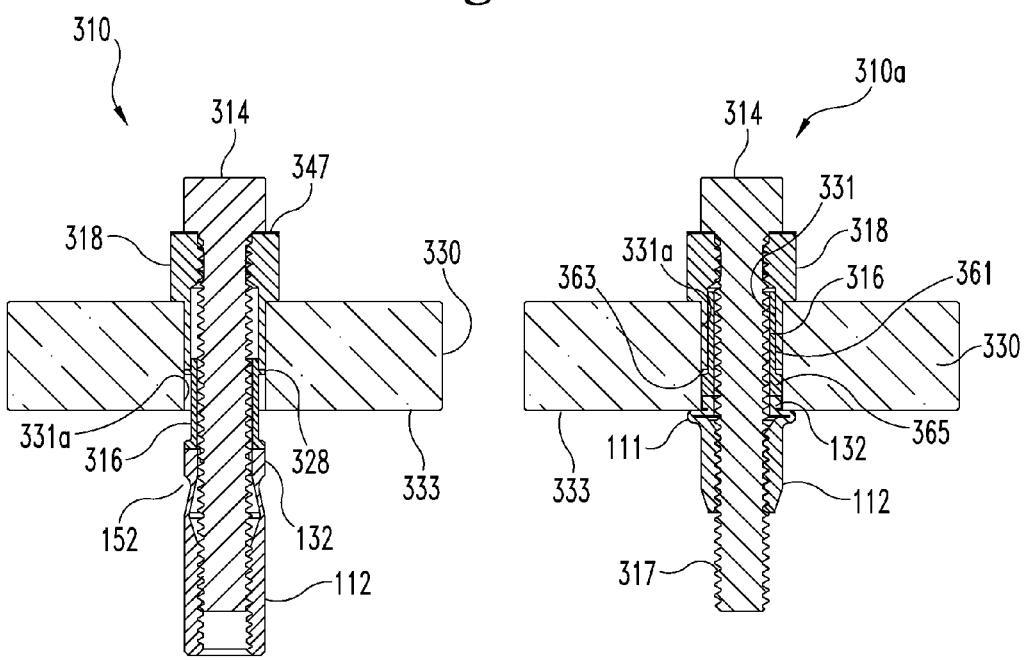
Fig. 41   Fig. 42

LOW PROFILE DUAL-ACTION DISPOSABLE CLAMP

This application is a continuation of PCT Application No. PCT/2010/04317 filed Jul. 16, 2010, which claims the benefit of U.S. Provisional Patent Application No. 61/226,358 entitled LOW PROFILE DUAL-ACTION DISPOSABLE CLAMP filed Jul. 17, 2009, which are each hereby incorporated by reference in their entirety. This application is a continuation-in-part of U.S. Utility patent application Ser. No. 12/098,857 filed Apr. 7, 2007, which is a continuation-in-part of U.S. Utility patent application Ser. No. 11/973,278, filed on Oct. 5, 2007 which claims the benefit of U.S. Provisional Patent Application No. 60/849,515 entitled "DUAL-ACTION DISPOSABLE CLAMP" filed on Oct. 5, 2006; U.S. Provisional Patent Application No. 60/857,700 entitled "DUAL-ACTION DISPOSABLE CLAMP" filed on Nov. 8, 2006; and U.S. Provisional Patent Application No. 60/901,171 entitled "DUAL-ACTION DISPOSABLE CLAMP WITH CLUTCH NUT" filed on Feb. 13, 2007, which are each hereby incorporated by reference in their entirety.

BACKGROUND

Modern aircraft are manufactured from numerous panels and other parts that are fastened together with rivets, screws, bolts, and other permanent fasteners. To aid in assembly, parts are typically held together with temporary clamps and fixtures until permanent fasteners can be installed. Parts that incorporate sealant on the mating surfaces require that the temporary clamps exert sufficient force to squeeze excessive sealant from the joint while pulling parts together before the sealant fully cures. For example, some heavy structures fastened with five-sixteenths of an inch size permanent fasteners, require in excess of 500 pounds clamp load to squeeze the sealant out to an acceptable thickness and hold the components together. Other applications, such as in wing-to-body joints, require upwards of 1500 pounds with five-sixteenths of an inch size fasteners to temporarily secure components. The clamp load requirements for other sizes are generally proportional to the cross-sectional area of the basic fastener diameter.

Blind hole clamps are desirable for airframe assembly, because their installation and removal can be more easily automated than the installation and removal of conventional bolts and nuts. However, some existing blind hole clamps cause surface damage either during the formation of the blind head or because the blind head is ineffective in distributing the clamp load over the surface.

Oftentimes, one or more work pieces are joined with clamps to maintain orientation during an autoclave curing cycle. Threaded-type reusable blind clamps are capable of high clamp loads, but lack the smooth shank needed to avoid clogging with resin as the parts are cured. As a result, the clamps are difficult to remove and may damage the work pieces upon removal. Furthermore, rework of the holes to remove excess cured shim or sealant may be required which, in addition to requiring additional time and materials, may also damage the work pieces. Some blind tack rivets have the required smooth shank but are incapable of imparting sufficient clamp load to maintain parts in the required orientation.

In addition, threaded temporary blind clamps are easily clogged with sealant and resins, making removal from assemblies difficult and necessitating cleaning and rework of the blind clamps before they may be reused. Another problem with threaded temporary fasteners is that they protrude above the accessible panel surface by a relatively large amount. Accordingly, robotic assembly equipment must retract or back away from the work pieces to avoid collisions with installed clamps. As a result, installation of threaded temporary fasteners requires additional time for robotic assembly equipment to traverse from one location to another.

Finally, the clamping capability of many threaded temporary clamps is limited, because the blind head may be discontinuous and high clamp loads result in surface damage to the work pieces. Temporary blind tack rivets have a low profile but must be removed by drilling through the manufactured head. Unfortunately, drilling through the rivet head can also damage panel surfaces. Another issue, for example, is that the rivet can spin in the hole during the drilling operation, halting the advance of the drill bit through the tack rivet and prolonging the removal cycle time. Tack rivets also have very low clamp loads and produce a small blind-side upset that is not suitable for use in laminated composite panels.

BRIEF DESCRIPTION OF THE DRAWINGS

FIGS. 2A, 2B and 2C illustrate a side elevational view, a cross-sectional view along line B-B, and a perspective view of the clamp of FIGS. 1A-1C at least partially installed in a work piece in an embodiment of the present invention.

FIGS. 5A and 5B illustrate a side elevational view and a cross-sectional view along line E-E of the clamp of FIGS. 4A and 4B with a wrenching tool engaged in an embodiment of the present invention.

FIGS. 6A and 6B illustrate a side elevational view and a cross-sectional view along line F-F of the clamp of FIGS. 4A and 4B with a wrenching tool engaged where the clamp may be removed from the work piece in an embodiment of the present invention.

FIG. 7 illustrates a power tool engaged with the clamp of FIGS. 3A through 3C in an embodiment of the present invention.

FIGS. 13A and 13B illustrate a side elevational view and a cross-sectional view along line G-G of an alternative embodiment of a clamp.

FIG. 13C illustrates a portion of the cross-sectional view of FIG. 13B.

FIGS. 14A and 14B illustrate a side elevational view and a cross-sectional view along line I-I of the clamp of FIGS. 13A and 13B partially installed in a work piece.

FIGS. 15A and 15B illustrate a side elevational view and a cross sectional view along line J-J of the clamp in FIGS. 13A and 13B partially installed in a work piece.

FIGS. 16A and 16B illustrate a side elevational view and a cross-sectional view along line K-K of the clamp in FIGS. 13A and 13B in an installed condition in a work piece.

FIGS. 17A and 17B illustrate a side elevational view and a cross-sectional view along line L-L of the clamp of FIGS. 13A and 13B where the clamp may be removed from the work piece.

FIG. 19 illustrates a side elevational view one embodiment of a bolt component of a clamp as described herein.

FIG. 20 illustrates a top plan view of a shift washer component of a clamp described herein.

FIG. 21 illustrates a side elevational view of the shift washer illustrated in FIG. 20.

FIG. 22 illustrates an exploded view of an alternative embodiment of the shift washer, thrust washer and spacer components used in one embodiment of a clamp described herein.

FIG. 23 illustrates a cross-sectional view of an uncrimped expander component of a clamp described herein.

FIG. 24 illustrates a cross-sectional view of an crimped expander component of a clamp described herein.

FIG. 25 illustrates a side elevational view of a shank used in an embodiment of a clamp described herein.

FIG. 31 illustrates a side elevational cross-sectional view of the FIG. 26 clamp inserted through a work piece.

FIG. 32 illustrates a side elevational cross-sectional view of the FIG. 26 clamp in an intermediate installation configuration.

FIG. 33 illustrates a side elevational cross-sectional view of the FIG. 26 clamp fully installed, clamping the work piece.

FIG. 37 illustrates a side elevational view of an alternative embodiment of a clamp.

FIG. 38 illustrates a cross-sectional view along line 38-38 of the FIG. 37 clamp.

FIG. 39 illustrates a perspective view of the FIG. 37 clamp.

FIG. 40 illustrates a side elevational view of an alternative embodiment of the FIG. 37 clamp inserted through a work piece.

FIG. 41 illustrates a cross-sectional view along lines 41-41 of the FIG. 40 clamp.

FIG. 42 illustrates a side elevational cross-sectional view of the FIG. 40 clamp in an installed configuration.

DETAILED DESCRIPTION OF THE DRAWINGS

Figure 1C:
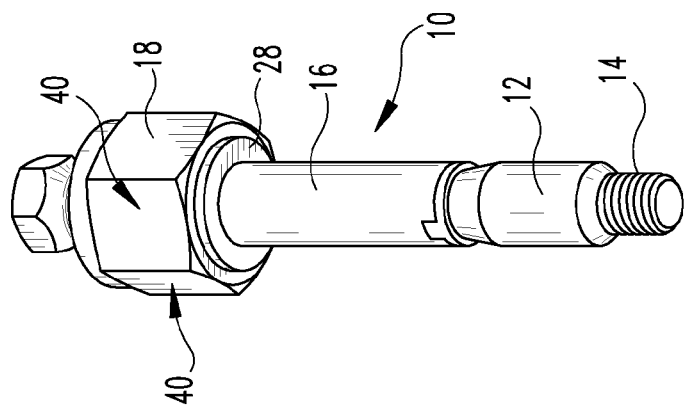
FIGS. 1A, 1B and 1C illustrate a side elevational view, a perspective view, and a cross-sectional view along line A-A of a clamp in an embodiment of the present invention.

For the purpose of promoting an understanding of the disclosure, reference will now be made to certain embodiments thereof and specific language will be used to describe the same. It will nevertheless be understood that no limitation of the scope of this disclosure is thereby intended, such alterations, further modifications and further applications of the principles described herein being contemplated as would normally occur to one skilled in the art to which the disclosure relates. In several FIGS., where there are the same or similar elements, those elements are designated with similar reference numerals.

Disclosed herein is a deformable sleeve that can be incorporated in a blind side fastener that is deformable from a shape that fits through an aperture to a flanged shape that provides a clamping surface around the aperture the sleeve previously passed through. The terms "bulb," "bulbed," and "bulbing" are used herein to describe the deformation process and the result of that process where the outer diameter of the deformable sleeve swells upon application of a compressive load that buckles the deformable sleeve in a predetermined fashion to form the desired flanged shape.

Also related to the formation of the flange, the term "non-canted" is used to describe the transition between the axial surface of the sleeve that is not deformed and the deformed portion of the sleeve that creates a substantially perpendicular surface of the flange that clamps against the blind surface of the work pieces. The term "non-canted" refers to the portion of the flange covering the work piece around the aperture not being part of the transition between the flange surface and the axial sleeve surface, thereby avoiding stress concentrations at the edge of the aperture through the work piece.

Referring now to the drawings, and in particular to FIGS. 1A-3C, a clamp 10 is illustrated generally comprising: a core bolt 14 in threaded engagement with an expander 12, a shank 16, a spacer 18 and a thrust washer 21. Core bolt 14 includes externally threaded portion 17 and head portion 19. Core bolt 14 is a mechanical fastener and externally threaded portion 17 is a securing portion of mechanical fastener 14. Expander 12 includes first end 22, second end 23, bulbing portion 25, positioned between first and second ends 22 and 23, and internally threaded portion 20. The expander 12 is positioned at a first end of the core bolt 14 such that the core bolt 14 is movable through the expander 12. Specifically, applying torque to the core bolt 14 drives the core bolt 14 through the expander 12. The core bolt 14 may have wrenching portions 8 that are sized and shaped to be rotated by, for example, a wrenching tool. In one embodiment, the expander 12 is internally threaded and is in meshing threaded engagement with external threads 17 of the core bolt 14.

Figure 1B:
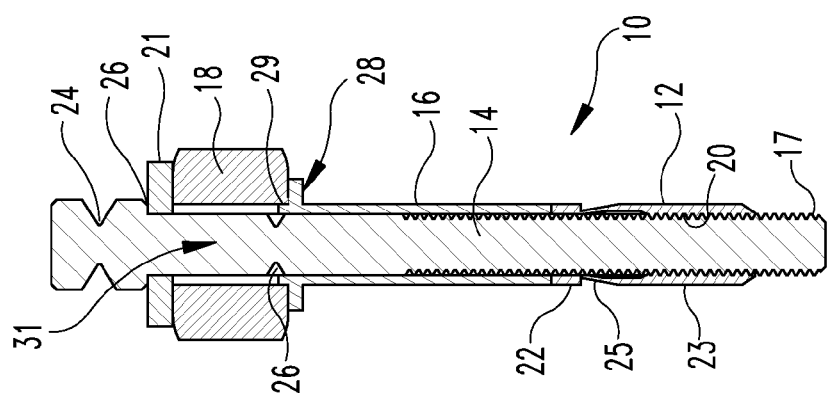

In one illustrated embodiment, a first break groove 24 is positioned at a second end of the core bolt 14, opposite the expander 12. A second break groove 26 is positioned between the first break groove 24 and the first end of the core bolt 14. The first break groove 24 and the second break groove 26 may be weakened portions of the core bolt 14 that fail at predetermined torque or compression loads. In one embodiment as shown in FIGS. 1B and 3B, second break groove 26 is a notch around the circumference of core bolt 14. In another embodiment, as shown in FIG. 2B, second break groove 26 is a dog-bone shaped narrowing of core bolt 14. These embodiments of second break groove 26 are discussed in greater detail below.

Figure 3C:
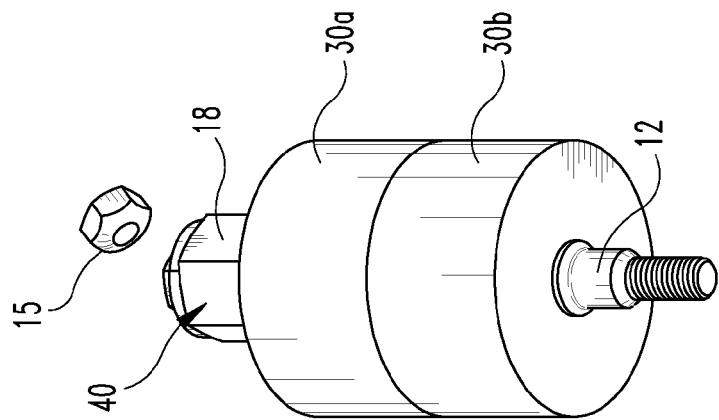
FIGS. 3A, 3B and 3C illustrate a side elevational view, a cross-sectional view along line C-C, and a perspective view of the clamp of FIGS. 1A-1C in an installed condition in an embodiment of the present invention.
Figure 3B:
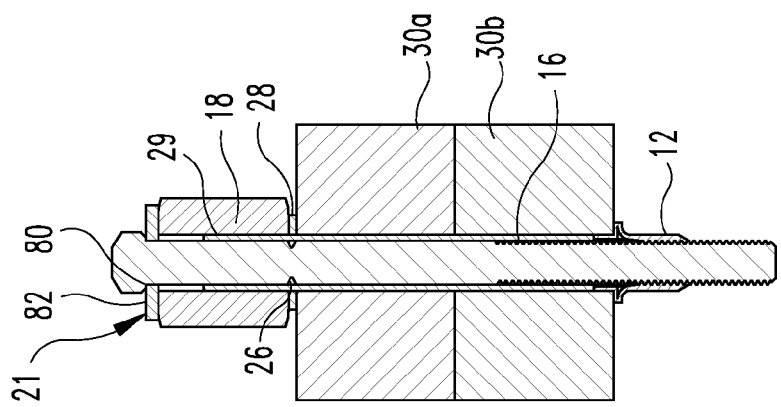
Figure 3A:
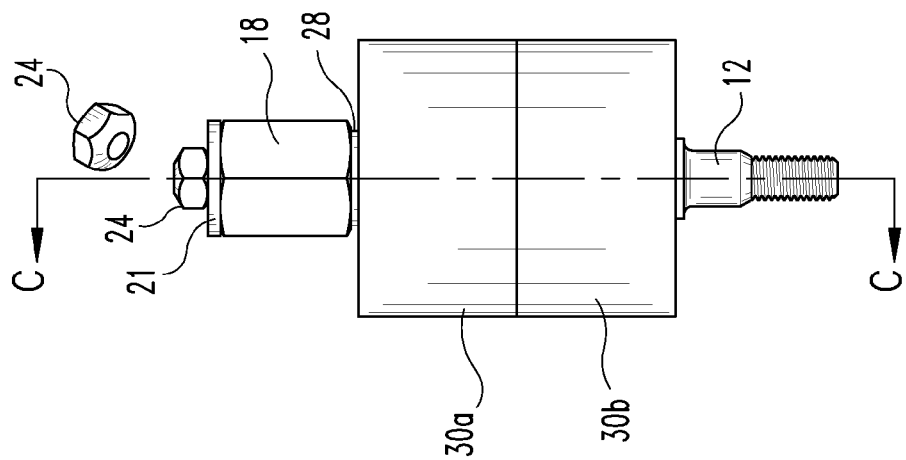
Figure 4B:
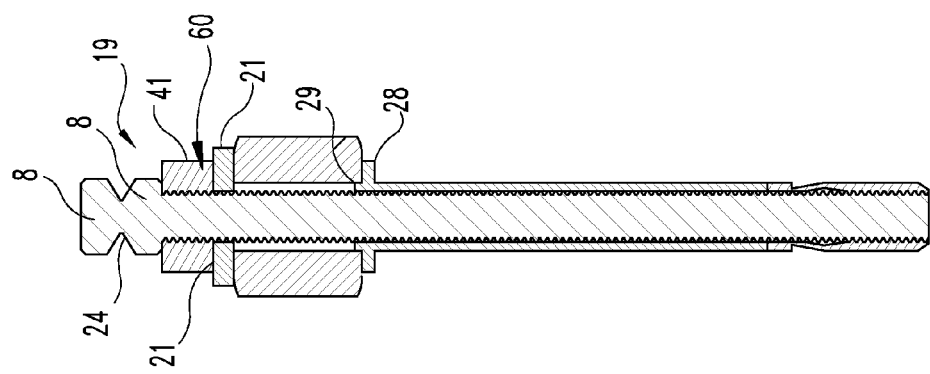
FIGS. 4A and 4B illustrate a side elevational view and a cross-sectional view along line D-D of a clamp having a clutch nut in an embodiment of the present invention.
Figure 4A:
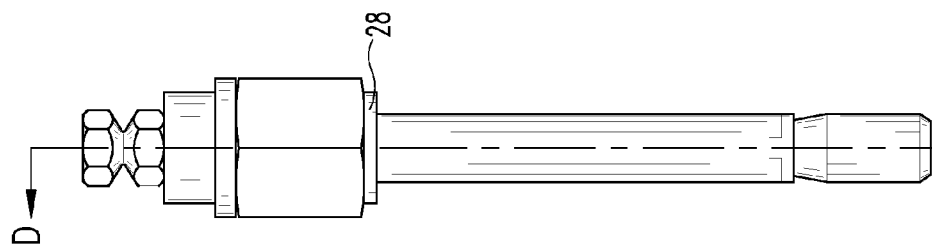

In another embodiment, the first break groove 24 is sized to fail prior to the second break groove 26, as shown in FIGS. 3A-3C. For example, at a torque sufficient to clamp work pieces 30a, 30b together a desired amount, the first break groove 24 fractures and a portion of the core bolt 14 is severed. The second break groove 26 will remain intact until it is desired to remove the core bolt 14 from the work pieces 30a, 30b. To do so, additional torque may be provided on the core bolt 14 to fracture the core bolt 14 at the second break groove 26.

Figure 1A:
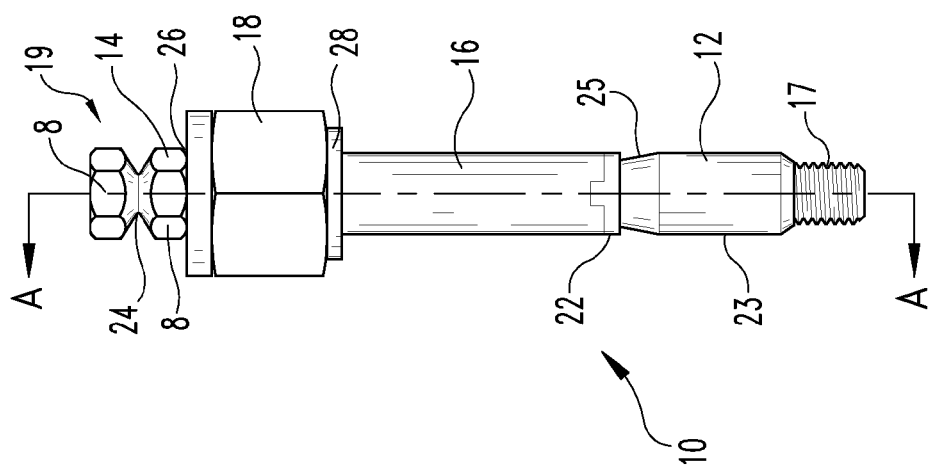

A shank 16 may be positioned between the first end of the core bolt 14 and the expander 12. In one embodiment, the expander 12 is rotationally keyed to the shank 16 such that rotation of the shank 16 rotates the expander 12, as shown in FIGS. 1A-1C. The threaded core bolt 14 slides inside the shank 16 along the length of the core bolt 14. As torque is applied to the core bolt 14, the core bolt 14 rotates in the shank 16 and threads into the expander 12 as shown in FIGS. 2A-3C. The core bolt 14 moves through the expander 12 causing the expander 12 to bulb or to expand to a size in which the expander 12 has a larger diameter than the diameter of the shank 16 and the diameter of the hole in the work pieces.

The shank 16 has a flange 28 extending outward from the outer diameter of the shank 16. The flange 28 may be an enlarged portion extending in a direction perpendicular to the axis of the shank 16. In the illustrated embodiment, the flange 28 is integrally formed with the shank 16. The flange 28 may be sized such that the flange 28 limits the amount of the load that may be induced into the expander 12. At a predetermined axial load, the flange 28 shears loose from the shank 16 and allows the shank 16 to move into bore 31 of the spacer 18.

A spacer 18 may be positioned at an end of the shank 16. In an embodiment, the spacer 18 engages a flange 28 of the shank 16 and may prevent rotation of the shank 16 when torque is applied to the core bolt 14. The spacer 18 may have wrenching flats 40 for engagement with wrenching tools, for example, a tool to prevent rotation of the spacer 18. The spacer 18 may have a bore 31 in which the core bolt 14 may extend there through.

A boss 29 may extend from an end of the shank 16 opposite the expander 12. The spacer 18 may be positioned at an end of the shank 16 adjacent the boss 29. The bore 31 of the spacer 18 may be an interference fit with the boss 29 of the shank 16 such that the shank 16 is rotationally restrained. The boss 29 of the shank 16 extends into and frictionally fits within the spacer 18. In an embodiment, the boss 29 and the bore 31 in the spacer 18 are non-circular to rotationally key the shank 16 and the spacer 18 together. For example, the bore 31 and the boss 29 may have corresponding shapes such that relative rotation is prevented. The spacer 18 may be positioned such that the underside of the spacer 18 abuts the flange 28 of the shank 16.

A washer 21 may be positioned between the spacer 18 and an end of the core bolt 14. In one embodiment, the washer 21 may be a thrust washer or other type of resilient element to spread the compressive stresses over a larger area than without the washer 21. Bearing surfaces 80 of the core bolt 14 may bear against a top side 82 of the washer 21, as best illustrated in FIG. 3B. In another embodiment, the washer 21 may be bowed to act as a resilient element, for example, as a spring washer to maintain compressive loads on the work pieces 30a, 30b.

The clamp 10 may be installed by an automated process or by automated equipment, such as robotic equipment. For example, after inserting the clamp 10 into aligned apertures in the work pieces 30a, 30b, a tool 100 may engage the spacer 18 and the wrenching surfaces 40 of the spacer 18. Clamp 10 may be inserted into a top surface 30c of the work piece 30a and may extend through to a blind side 30d of the work piece 30b with expander 12 spaced apart from blind surface 37 as illustrated in FIG. 2A. In one embodiment, the tool 100 (see FIG. 7) may have a first component 56 for rotationally restraining the spacer 18, which, in turn, prevents the shank 16 from rotating as illustrated in FIG. 7. The tool 100 may have a second component (such as tool 52 illustrated in FIGS. 5B and 6B and described below) to provide torque to the core bolt 14 to move core bolt 14.

In alternative embodiments, the tool 100 may be used by or incorporated into robotic or other automated equipment to thread the core bolt 14 into the expander 12 and cause the expander 12 to bulb or otherwise enlarge while being spaced apart from blind surface 37 so that the flange is formed without exerting an initial clamping load on work pieces 30a and 30b. Once the expander 12 is fully bulbed, as shown in an embodiment in FIGS. 3A-3C, the compressive load on the shank 16 increases until the flange 28 on the shank 16 shears loose at a predetermined compressive load. In one embodiment, the flange 28 shears at a compressive load of 1000 pounds for a five-sixteenths inch size fastener. Continued rotation of the core bolt 14 causes the shank 16, with the expander 12 attached, to translate into the spacer 18 until the expander 12 contacts the far side of the work pieces 30a, 30b. When the flange 28 shears loose, the torque required to drive the core bolt 14 may drop to a negligible amount or nearly zero, but the torque required to drive the core bolt 14 may increase as the expander 12 contacts and clamps the work pieces 30a, 30b together.

The installation of the clamp 10 may be controlled by controlling the installation torque, or by use of the first break groove 24. For example, when the torque required to continue rotating the core bolt 14 exceeds the strength of the first break groove 24, a portion 15 of the core bolt 14 severs as shown in FIGS. 3A-3C. To facilitate removal of the clamp 10, the tool 100 may be applied to the core bolt 14 to apply torque and rotate the core bolt 14. At a predetermined amount of torque, the second break groove 26 fails and the spacer 18, the washer 21, and the shank 16 are discarded from the accessible-side of the work pieces 30a, 30b. The expander 12 and remaining portion of the core bolt 14 may be pushed through the work pieces 30a, 30b and discarded or otherwise moved through the work pieces 30a, 30b.

Advantageously, the tool 100 may be used to both install and to remove the clamp 10. To this end, the clamp 10 may effectively be used as a temporary fastener for clamping panels and other objects together. In addition, drilling to remove the clamp 10 is eliminated. Accordingly, the damage caused by off-center drilling and the generation of metal chips caused by drilling are eliminated.

Figure 8:
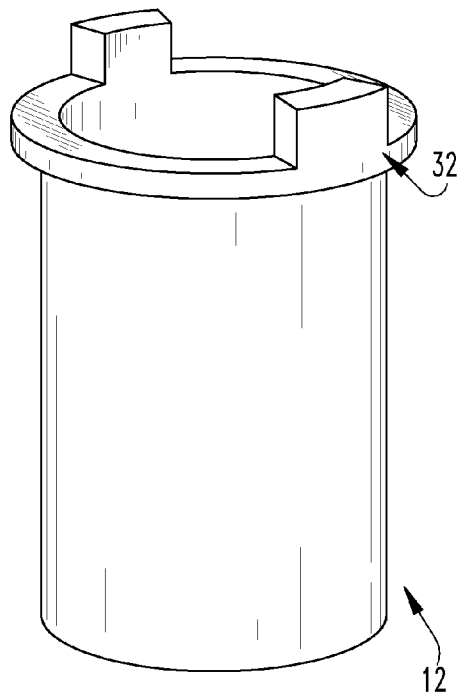
FIG. 8 shows a representative perspective view of an uncrimped expander component in an embodiment of the present invention.
Figure 9:
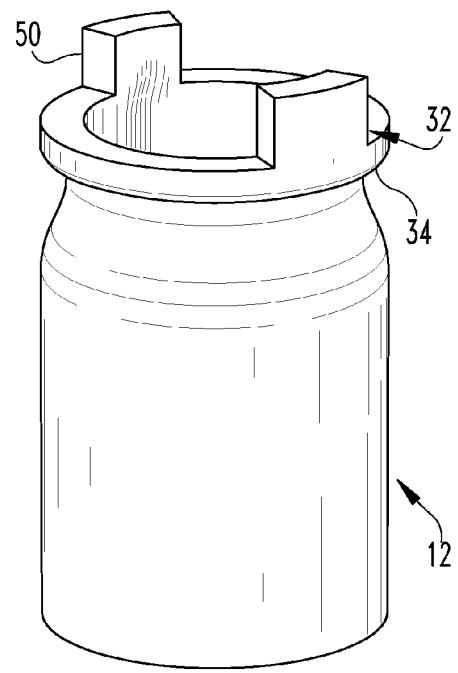
FIG. 9 shows a representative perspective view of an expander component as crimped in an embodiment of the present invention.
Figure 10:
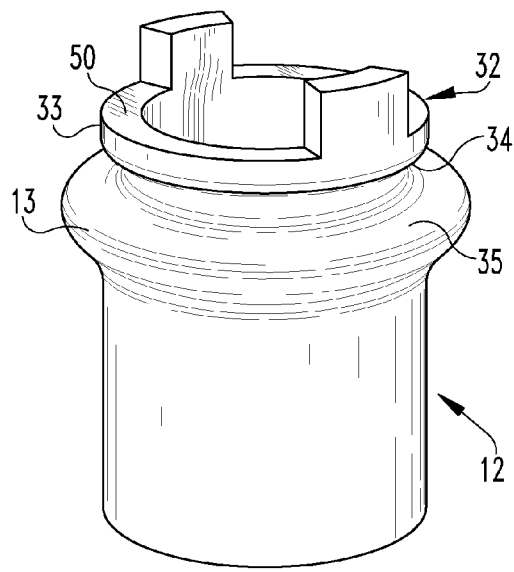
FIG. 10 shows a representative perspective view of an expander component as partially formed in an embodiment of the present invention.
Figure 11:
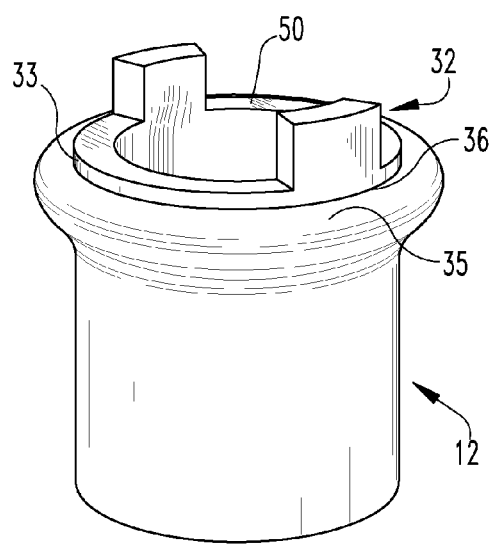
FIG. 11 shows a representative perspective view of an expander component as completely formed in an embodiment of the present invention.

In addition, the bulbing nature of the expander 12 ensures that clamp loads are spread over a relatively large area to avoid damaging the work pieces 30a, 30b. The pre-bulbed geometry of the expander 12 ensures that the apertures of the work pieces 30a, 30b do not become rounded or otherwise damaged. In an embodiment, the expander 12 may have a flanged end 32, as illustrated in FIGS. 8-11, which show expander 12 in four different stages. FIG. 8 shows expander 12 as manufactured prior to the flanged end 32 being crimped or swaged inwardly by mechanical treatment during manufacture as best shown in FIG. 9. In the illustrated embodiment, expander 12 has a thicker-walled leading edge 50 that resists buckling and a thin-walled bulbing region bound on one end by transition portion 34 which has a diameter slightly less than the hole diameter in the work pieces 30a, 30b. This arrangement results in a sharp, non-canted transition 36 between leading edge 35 and outer edge 33 such that edge interference between an aperture rim and outer edge 33 or leading edge 35 is avoided, as illustrated in FIGS. 10-11.

Figure 12:
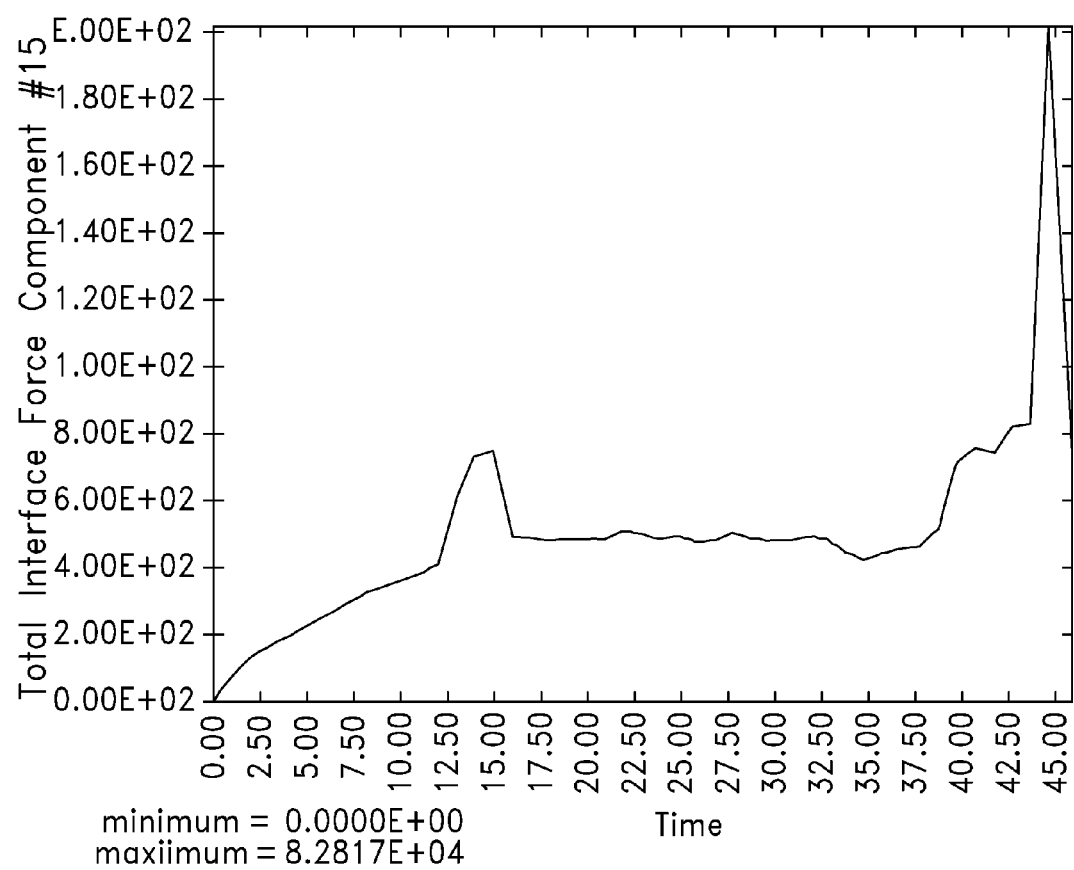
FIG. 12 illustrates a graph of a predictable load curve of an expander in an embodiment of the present invention.

FIG. 12 illustrates a predicted load curve with bulbing of the expander 12 indicated at approximately eight hundred pounds for a five-sixteenths size clamp. Of course, the clamp 10 may be modified to change the load in which bulbing occurs as will be appreciated by one of ordinary skill in the art.

Advantageously, embodiment of clamp 10 illustrated in FIGS. 1-3 avoids clogging with resins and sealants due to the cylindrical and smooth shape of the shank 16. The design, shape and size of the clamp 10 allows incorporation of the clamp 10 into many applications where known rivets and clamps are not as suitable, such as, in use with composite material cured in autoclave.

The grip range of the clamp 10 may correspond to or may be controlled by the length of the spacer 18. For example, the spacer 18 may have a length sufficient to receive the shank 16 after the flange 28 shears loose. A low profile for efficient robotic applications is possible by limiting the grip range. For example, a five-sixteenths of an inch size clamp having a three-eighths inch gripping range may have an installed protrusion approximately one inch above the accessible-side of the work pieces 30a, 30b.

In another embodiment, the clamp 10 has a nut 60 that is at least partially engaged with the core bolt 14 as illustrated in FIGS. 4A-6B. In such an embodiment, the core bolt 14 may be threaded from the end adjacent the expander 12 to the wrenching portions 8. Accordingly, the nut 60 may be in threaded engagement with the core bolt 14. The nut 60 may be, for example, cylindrical and internally-threaded. In one embodiment, the nut 60 may be positioned between the thrust washer 21 and the head portion 19 of core bolt 14. Upon installation, the nut 60 may freely rotate with the core bolt 14 and may act as an extension of a head portion 19 of the core bolt 14.

Referring to FIGS. 5A and 5B, tool 51 is illustrated. Tool 51 comprises inner tool 52 and outer tool 54. Outer tool 54 comprises cylindrical bore 55 with one-way clutch 57 and hex insert 58 press fit inside cylindrical bore 55. Inner tool 52 includes wrenching surfaces or a one-way clutch, as appropriate; to rotate wrenching portions 8 on core bolt 14. One-way clutch 57, as shown, is engaged with outer surface 41 of nut 60. Hex-insert 58, as shown, is engaged with wrenching flats 40 on spacer 18.

During removal of the clamp 10, as illustrated in FIGS. 6A and 6B, the nut 60 may be fixed and prevented from rotation by, for example, one-way clutch 57. An outer surface 41 of the nut 60, for example, may be engaged by a one-way clutch, a roller-type clutch or other structure that allows rotation of the nut 60 during installation but prevents rotation of the nut 60 when the core bolt 14 is rotated in the removal direction. Upon removal, the core bolt 14 unthreads from the nut 60 and the expander 12. The expander 12 may remain keyed to the shank 16 which remains keyed to the spacer 18.

In such an embodiment, the first break groove 24 may be incorporated into the clamp 10 and may be dependent upon whether the clamp 10 is configured for installation with torque-controlled tools. The second break groove 26 may be absent in this embodiment since removal may be accomplished by unthreading the core bolt 14 from the assembly, rather than fracturing the core bolt 14 to separate components of the clamp 10. Of course, the first break groove 24 and the second break groove 26 may be incorporated in such an embodiment as will be appreciated by one of ordinary skill in the art.

Referring now to FIGS. 13A-18, clamp 110 is illustrated in several embodiments. Clamp 110 includes core bolt 114, thrust washer 121, spacer 118, shift washer 128, shank 116 and expander 112. Core bolt 114 is a mechanical fastener.

As shown in FIGS. 13A, 13B and 13C, core bolt 114 comprises bolt head 107 including wrenching portions 108, top portion 107a, bottom portion 107b and first weakened region 124. Core bolt 114 also includes second weakened region 126 and threaded portion 117. Shift washer 128 includes shear segment 129 and weakened regions 125. In some embodiments, shift washer 128 and/or thrust washer 121 act as a spring washer to maintain compressive loads in clamp 110. Shank 116 includes boss 115, shoulder 109 and key receptacle 113b and expander 112 includes key 113a. Spacer 118 includes bore 131, wrenching flats 140 and recesses 119 on the top and bottom of spacer 118.

Clamp 110 shares several similar features with clamp 10 described above but also includes several differences. In particular, it should be noted that first weakened region 124 differs from first break groove 24 in that first weakened region 124 includes a longer area of minimum diameter as compared to first break groove 24. As will be discussed below, either weakened region 124 or first break groove 24 may be used in any of the embodiments illustrated herein. Similarly, second weakened region 126 also includes an elongated portion having a reduced diameter as compared with second break groove 26 as shown in FIGS. 1B and 3B.

Another difference between clamp 110 and clamp 10 is that flange 28 of clamp 10 is essentially replaced by shift washer 128 in clamp 110. While flange 28 is disclosed as integral with shank 16, shift washer 128 is separate from shank 116. In either embodiment, flange 28 or shift washer 128 serves as a means to prevent shank 16 or shank 116 from translating into bore 31 or bore 131 of spacer 18 or spacer 118 until after expander 12 or expander 112 has substantially completed bulbed, as described herein. In yet another embodiment (not illustrated), shift washer 128 is incorporated with spacer 118 as a unitary structure which also serves as a means to prevent shank 16 or shank 116 from translating into bore 31 or bore 131 of spacer 18 or spacer 118 until after expander 12 or expander 112 has substantially completed bulbed.

Clamp 110 is configured with thrust washer 121 adjacent to bottom portion 107b and partially in recess 119 on the top of spacer 118 with shift washer 128 partially in recess 119 on the bottom of spacer 118. The recess 119 on the bottom of spacer 118 and/or shift washer 128 may optionally include knurling or other friction enhancers or mechanical interlocks at the interface between these components as are known in the art to reduce relative rotation between spacer 118 and shift washer 128.

Boss 115 passes through the center of shift washer 128 with shoulder 109 on shank 116 abutting shift washer 128 against shear segment 129 over core bolt 114. Boss 115, shoulder 109 and/or shift washer 128 may optionally include knurling or other friction enhancers or mechanical interlocks at the interface between these components as are known in the art to reduce relative rotation between shift washer 128 and shank 116. Expander 112 abuts shank 116 on threaded portion 117 of core bolt 114. Shank 116 and expander 112 are rotationally restrained together by key 113a positioned in key receptacle 113b. In alternative embodiments, other methods known to those skilled in the art may be used to rotationally restrain shank 116 and expander 112 together over core bolt 114.

Recesses 119 in spacer 118 serve to center thrust washer 121 and shift washer 128 over bore 131. Boss 115 serves to center bolt 114 in the middle of shift washer 128. Similarly, thrust washer 121 centers bolt 114. Thrust washer 121, shift washer 128 and boss 115 in combination serve to center bolt 114 in the middle of bore 131. Such centering serves to ensure shoulder 109 is aligned with shear segment 129 and bore 131 to permit passage of shank 116 though bore 131 as described herein. It has been found that accurately aligning shank 116, shift washer 128 and bore 131 decreases variances in the force required to separate shear segment 129 from shift washer 128 as described below.

As assembled as shown in FIGS. 13A, 13B and 13C, clamp 110 may include some amount of preload to hold the individual components of clamp 110 together and to permit friction to prevent relative rotation of some components. For example, it may be beneficial for shank 116, shift washer 128 and spacer 118 to be held together so that it will be possible to secure shank 116 from revolving by restraining wrenching flats 140.

Bore 131 through spacer 118 may optionally include longitudinal knurling or other irregularities to reduce rotation of shank 116 as it progresses through spacer 118 as described below.

Referring to FIGS. 14A and 14B, clamp 110 is illustrated partially installed through work pieces 130a and 130b. Work piece 130a includes aperture 131a and front side aperture rim 132a while work piece 130b includes aperture 131b, blind surface 133 and blind side aperture rim 132b.

As illustrated in FIGS. 14A and 14B, clamp 110 includes bulbed expander 112'. Bulbing expander 112 into bulbed expander 112' is the first stage of installation of clamp 110. After inserting clamp 110 through aperture 131a and 131b, expander 112 is bulbed to form bulb expander 112' by restraining wrenching flats 140 while rotating wrenching portion 108 to revolve core bolt 114 and threaded portion 117 with respect to shank 116 and expander 112. As expander 112 advances along threaded portion 117, shank 116 restrains the top portion of expander 112 while the bottom portion of expander 112 continues to advance along threaded portion 117 of core bolt 114. This exerts a compression force on expander 112, causing expander 112 to deform into bulbed expander 112' including flange 111. In one embodiment, flange 111 extends substantially perpendicular to the axis of shank 116 and the remaining portions of expander 112 forming a substantial flange to engage blind side aperture rim 132b with substantially uniform pressure. Similarly, in one embodiment, shift washer 128 provides uniform clamping force against front side aperture rim 132a. In the illustrated embodiment, shift washer 128 is substantially flat, however, other embodiments are contemplated wherein shift washer 128 is whatever shape is required to uniformly engage front side aperture rim 132a. In alternative embodiments, additional washers or other structures/supports may be located on or around shank 116 and adjacent to shift washer 128 to permit the use of clamp 110 with irregular geometries, such as countersunk apertures (not illustrated).

FIGS. 14A and 14B, illustrated expander 112 fully bulbed with shift washer 128 intact and shear segment 129 attached to shift washer 128. This permits flange 111 and bulb expander 112' to be substantially fully formed prior to drawing work pieces 130a and 130b together. Further tightening of shaft 114 as illustrated in FIG. 14b results in shear segment 129 separating from shift washer 128 permitting shank 116 to advance into spacer 118 as shown in the following figures. Accordingly, in the illustrated embodiment, the compressive/torsion forces required to bulb expander 112 are less than the force required to fracture shear segment 129 from shift washer 128 or first weakened region 124 or second weakened region 126.

FIGS. 15A and 15B illustrate shank 116 partially advanced into spacer 118 with shear segment 129 separated from shift washer 128' and positioned above shank 116. FIGS. 15a and 15b illustrate clamp 110 prior to drawing work pieces 130a and 130b together but after shear segment 129 has separated from shift washer 128'.

Referring now to FIGS. 16A and 16B, clamp 110 is illustrated fully installed with work pieces 130a and 130b clamped together with flange 111 abutting blind side aperture rim 132b and shift washer 128' abutting front side aperture rim 132a. Shank 116 and shear segment 129 fill the majority of the length 118D of spacer 118. Also, first weakened region 124 on bolt head 107 has fractured, separating bolt head 107 into top portion 107a and bottom portion 107b, with bottom portion 107b continuing to abut and restrain thrust washer 121.

Referring to FIGS. 17A and 17B, clamp 110 is illustrated in the process of being removed from work pieces 130a and 130b. Specifically, weakened region 126 has fractured due to continued rotation of core bolt 114 from the position illustrated in FIGS. 16A and 16B such that second weakened region 126 has failed separating core bolt 114 from threaded portion 117. As illustrated, expander 112' is connected to threaded portion 117 and available for removal from the blind side of work piece 130b while the remaining portions of core bolt 114, shank 116, thrust washer 121, spacer 118, shear segment 129 and shift washer 128' are available for removal from the front side of work piece 130a.

As should be apparent from the above description of FIGS. 13-17, the failure point of four different components needs to be controlled so that installation occurs as described. First, expander 112 should substantially fully bulb prior to any other component fracturing. Next, shear segment 129 should shear off shift washer 128 prior to the first or second weakened regions 124 and 126 failing. Next, first weakened regions 124 should fracture prior to second weakened region 126, allowing top portion 107a to be removed, indicating clamp 110 is installed. Finally, second weakened region 126 fractures, severing the internal connections clamping work pieces 130a and 130b together and permitting the removal of the various components of clamp 110 from work pieces 130a and 130b.

Figure 18:
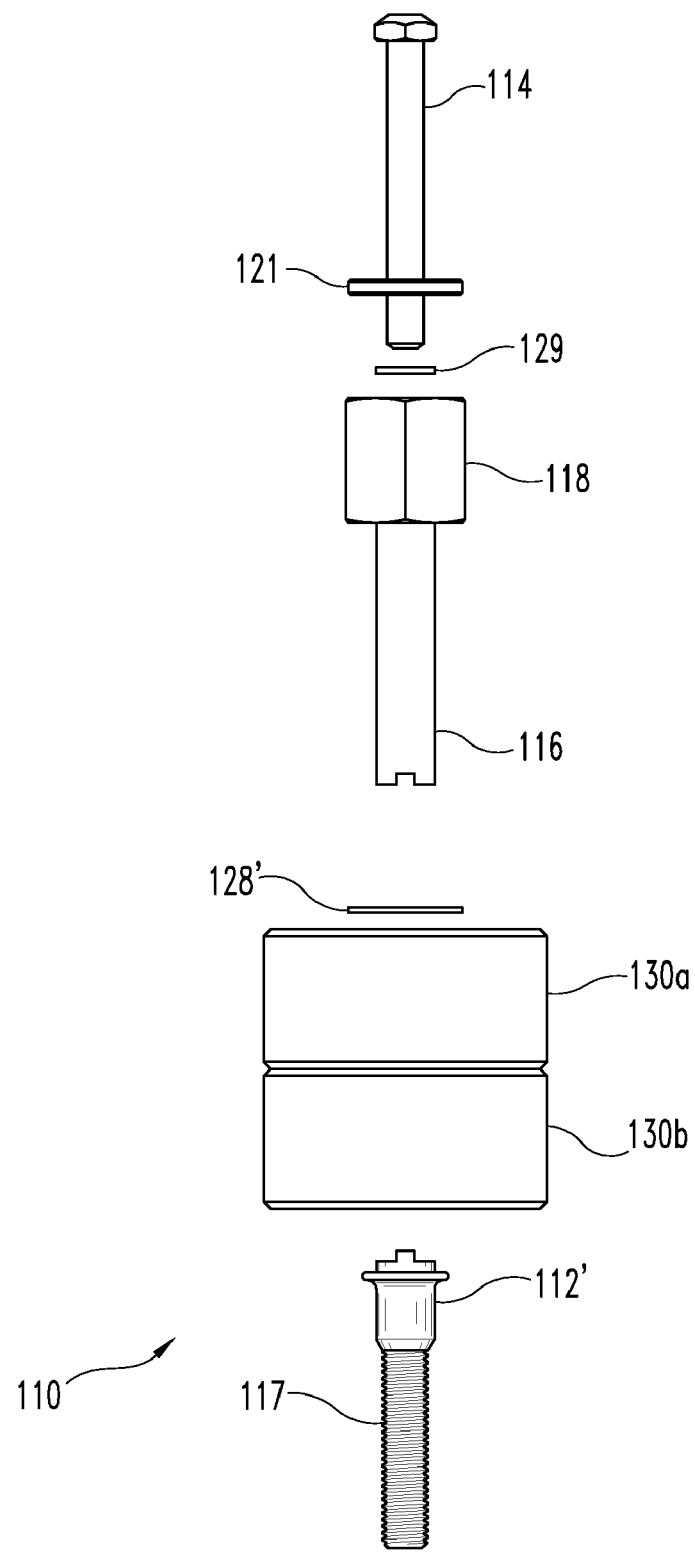
FIG. 18 illustrates an exploded view of several components of one embodiment of the clamp of FIGS. 13A and 13B after removal from the work piece.

Referring now to FIG. 18, several of the components of clamp 110 are illustrated after removal from work piece 130a and 130b including core bolt 114, thrust washer 121, shear segment 129, spacer 118 including shank 116, shift washer 128', bulbed expander 112' and threaded portion 117.

Referring to FIG. 19, one embodiment of core bolt 114 is illustrated in greater detail, in particular, first weakened region 124 is shown having length 124L representing the linear length of the narrowed diameter of first weakened region 124. Similarly, second weakened region 126 is illustrated having a length 126L representing the length of the portion having a narrowed diameter in second weakened region 126. These embodiments may reduce the amount of energy released when first and second weakened regions 124 and 126 fracture as compared to other embodiments disclosed utilizing notched break grooves.

In this regard, in some applications it may be undesirable to release a substantial amount of energy when fracturing threaded portion 117 from the rest of core bolt 114. Such energy could be released in the form of kinetic energy imparted to the various components of clamp 110. While portions located on the front side of work piece 130a are likely restrained by the tool used to fracture clamp 110, no similar structure would restrain the portions located on the blind side of work piece 130b. It is possible for components such as threaded portion 117 and bulbed expander 112' to be ejected from aperture 131b with sufficient velocity to damage other components that may be located in their path.

Conversely, a brittle type fracture of first weakened region 124 may be desirable to generate a distinct failure indicator with fewer rotations of bolt head 108. And many embodiments will have a tool engaged with top portion 107a when first weakened region 124 is fractured that could absorb any imparted kinetic energy, potentially mitigating top portion 107a as a projectile.

The particular embodiment selected for a particular bolt 114 or 14 depends upon the particular application and material used for bolt 114 or 14. Providing a longer narrowed diameter, such as 124L or 126L, may increase the amount of plastic deformation that occurs prior to fracture and may shift the fracture from a brittle type rapid fracture to a ductile type tear with reduced energy release during the tear. One consequence of using weakened regions such as 124 or 126 as compared to break grooves 24 or 26 is a greater number of rotations of bolt 114 or 14 could be required to complete the desired fracture.

In yet other embodiments, a notch type weakened region could be utilized having a radius sufficient to reduce or eliminate any notch type stress concentration factors (not illustrated). In any event, desirable performance characteristics can be achieved in the first and second weakened regions 124 and 126 by balancing bolt material with geometry considerations of the first and second weakened regions 124 and 126, including, but not limited to, minimum diameter, notch effects, length 124L and/or 126L, and/or other stress concentrators or stress relievers.

Referring to FIGS. 20 and 21, one embodiment of shift washer 128 is illustrated including weakened region 125. As illustrated in FIGS. 20 and 21, weakened region 125 is a depression on both the top and bottom of shift washer 128 narrowing the effective thickness of shift washer 128 and also defining shear segment 129. In one embodiment, weakened region 125 may be machined into top and bottom or either the top or the bottom of shift washer 128. In another embodiment, weakened region 125 may be formed by a cold working stamp or bossing operation on the top and/or bottom of shift washer 128. In one embodiment, weakened region 125 is positioned approximately at the outer diameter of shank 116 to permit shank 116 to pass through shift washer 128 after separation of shear segment 129.

With further regard to shift washer 128, it should be understood that weakened region(s) 125 are optional. It is possible to control the force required to remove shear segment 129 from shift washer 128 by other means such as thickness control. However, weakened region(s) 125 provide one means to artificially modify the strength of stock material that may have varying shear properties. For example, an operator could control the size and/or depth and/or number of weakened region(s) to tailor a stock material to desired shear strength.

Referring now to FIG. 22, alternate embodiments of shift washer 128, spacer 118 and thrust washer 121 are illustrated. In particular, shift washer 128 includes flange 128.5 while thrust washer 121 includes flange 121.5. In the illustrated embodiment, flanges 128.5 and 121.5 are approximately the same dimension and each are sized to fit in recesses 118.5 located on the top and bottom of spacer 118. The embodiment illustrated at FIG. 22 permits spacer 118 to be installed in either direction, potentially reducing assembly error.

Referring now to FIGS. 23 and 24, an embodiment of expander 112 is illustrated as expander 112a. In FIG. 23, expander 112a is illustrated before any crimping or swaged as discussed above with regard to mechanically treating expander 12. As illustrated, expander 112a includes threaded portion 156, thin-walled bulbing region 152, transition 154, flanged end 132, leading edge 150 and key 113a. Thin-walled bulbing region 152 is defined by tapered wall portion 155 and thin-walled portion 153 between tapered wall portion 155 and transition 154. The portion of expander 112a around threaded portion 156 is sufficiently thick to resist buckling under the compressive load used to deform thin-walled bulbing region 152. As shown in FIG. 23, diameter 132D of flanged end 132 is greater than diameter 112D of expander 112a prior to being crimped or swaged as described above. In the illustrated embodiment, leading edge 150 and flange end 132 have sufficient wall thickness to resist buckling due to compressive loads described above.

Referring to FIG. 24, expander 112b is illustrated after flange end 132 has been crimped or swaged to reduce diameter 132D' of flanged end 132 to either equal to or less than diameter 112D of expander 112b. As illustrated in FIG. 24, thin-walled portion 153 is deformed into a frustoconical body between tapered wall portion 155 and transition 154 with transition 154 defining groove 157 on the outer surface of expander 112b. At its deepest point, groove 157 and transition 154 have an outer diameter of 154D that is smaller than either diameters 112D or 132D'. Thin-walled bulbed region 152 is predisposed to buckle on sufficient compressive load between flanged end 132 and threaded portion 156 to form flange 111. Of note, transition 154 is located inside of the outer diameter 132D' of flanged end 132 such that the radiused transition formed when thin-walled bulbed region 152 buckles while creating flange 111 during the bulbing of expander 112b forms a non-canted transition between thin-walled portion 153 on flange 111 and flanged end 132 that will not directly impact or contact blind side aperture rim 132b because such the radiused transition is located inside of aperture 131b.

Referring to FIG. 25, an embodiment of shank 116 is illustrated including boss 115, shoulder 109 and key receptacle 113b. For reference, in the illustrated embodiment, boss 115 extends from the inner diameter of shank 116 and has a wall thickness approximately one-third the wall thickness of shank 116. As described above, boss 115 abuts the inside of shift washer 128 and serves to help center shank 116 over bore 131 of spacer 118.

As should be apparent from the above descriptions, clamp 110 can be installed (and removed) using similar tools described above for use with clamp 10, including manual and automatic processes.

Also as described above with regard to clamp 10, the pre-bulbed geometry of expander 112 helps ensure that blind side aperture rim 132b does not become rounded or otherwise damaged during clamping. The pre-bulbed geometry can spread clamping forces evenly over a relatively large area to avoid damaging work piece 130b.

Also, clamp 110 retains the overall cylindrical and smooth shape exhibited by clamp 10, allowing the use of clamp 110 in many applications where other known rivets and clamps are not suitable such as when adhesives may extrude into apertures 130a and 130b.

In one embodiment, the following materials are used for components of clamp 110. Shank 116 is made from 7075-T6

Aluminum (Al) Alloy. Shift washer 128 is made from 6061-T6 Al Alloy. Spacer 118 is made from 2024-T4 or 7075-T6 Al Alloy. Expander 112 is made from one-quarter hard (17% cold reduced) austenitic stainless steel, such as AISI 304, or spheriodized annealed steel, such as AISI 8740. Core bolt 114 is made from 4130 steel, heat treated to 40-44 on the Rockwell C scale. The preceding embodiment is provided by way of example only. Other materials may be substituted as desired to obtain varying performance from clamp 110. In one embodiment, clamp 10 utilizes the same materials for corresponding components.

Figure 27:
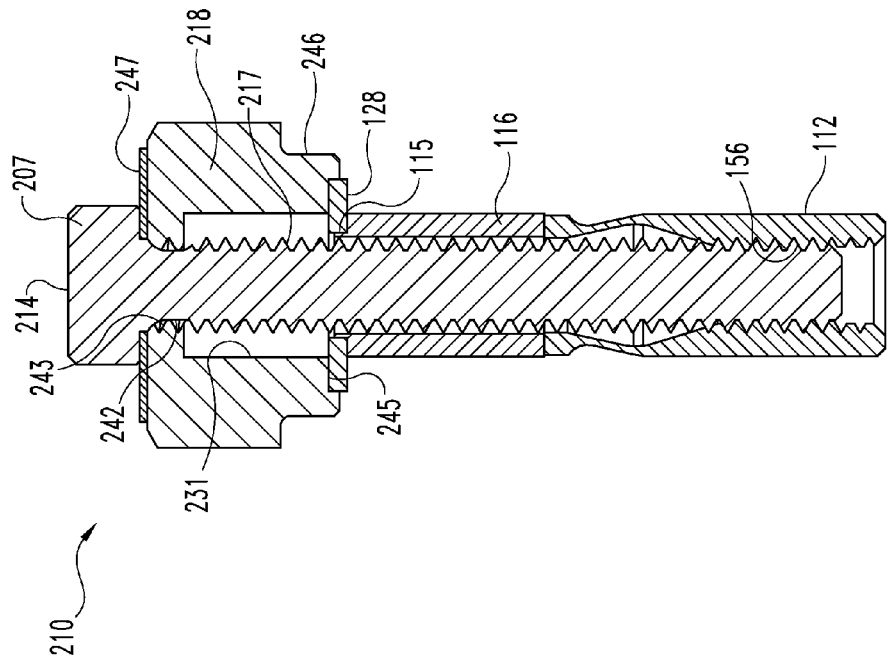
FIG. 27 illustrates a cross-sectional view along line 27-27 of the FIG. 26 clamp.
Figure 26:
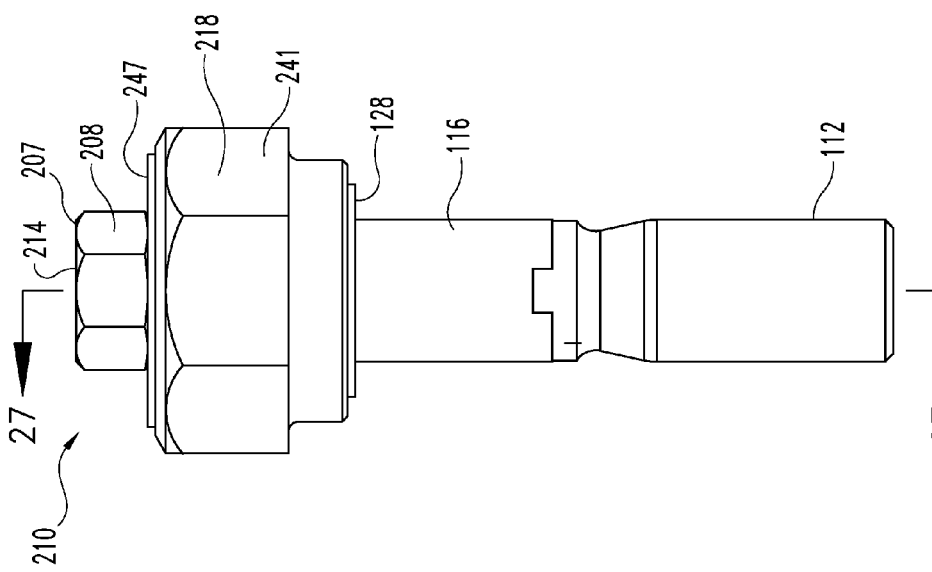
FIG. 26 illustrates a side elevational view of an alternative embodiment of a clamp.

Referring now to FIGS. 26-27, an alternate embodiment of a dual action disposal clamp is illustrated as clamp 210. Clamp 210 includes bolt 214, compression spring 247, spacer 218, shift washer 128, shank 116 and expander 112. Bolt 214 includes head 207 having wrenching flats 208, externally threaded portion 217 and undercut 242 between externally threaded portion 217 and head 207. Spacer 218 includes internally threaded portion 243, bore 231, wrenching portion 241, undercut 246 and recess 245. Internally threaded potion 243 is constructed and arranged to threadingly engage external threaded portion 217 with undercut 242 being constructed and arranged so that when bolt 214 is fully engaged through spacer 218, as illustrated in FIGS. 26 and 27, externally threaded portion 217 is not threadingly engaged with internally threaded portion 243 thereby permitting bolt 214 to freely rotate in spacer 218 without engagement between internally threaded portion 243 and externally threaded portion 217. In the illustrated embodiment, free rotation of undercut 242 inside of internally threaded portion 243 is, in part, accomplished by making the outer diameter of undercut 242 less than the minor diameter of internally threaded portion 243 and the longitudinal length of undercut 242 greater than the longitudinal length of internally threaded portion 243.

Clamp 210 is assembled with compression spring 247 atop spacer 218 then threading externally threaded portion 217 of bolt 214 through internally threaded portion 243. Shift washer 128 is positioned in recess 245 with base 115 centering shift washer 128 with respect to bolt 214 as described above. Finally, expander 112 is threaded onto bolt 214 by threadingly engaging externally threaded portion 217 into internally threaded portion 156 until shank 116 abuts shift washer 128 and expander 112. In the final stages of assembling clamp 210, compression spring 247 is compressed between head 207 and spacer 118.

In the illustrated embodiment, compression spring 247 is a disc spring also known in the art as a Belleville washer. Other embodiments can utilize other types of compression springs including, but not limited to, wave springs, finger springs, conically tapered helical coil springs or the like. Compression spring 247 is constructed and arranged to provide sufficient force and travel distance to separate bolt 214 from spacer bringing externally threaded portion 217 back into engagement with internally threaded portion 243 when bolt 214 is rotated in a loosening direction with respect to expander 112. This places bolt 214 in threaded engagement with spacer 218 so that continued rotation of bolt 214 in a loosening direction forces head 207 away from spacer 218. At the same time, expander 112 is held against shank 116 so that expander 112 is rotationally constrained by shank 116 (which is rotationally restrained in bore 231) so that expander 112 does not spin with rotation of bolt 214, permitting the extraction of bolt 214 from expander 112. This arrangement allows clamp 210 to be disassembled and removed after use by extracting bolt 214 from expander 112.

Figure 28:
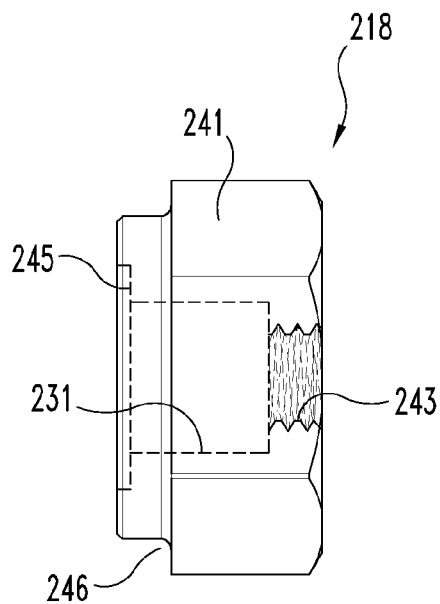
FIG. 28 illustrates a side elevational view of a spacer, a component of the FIG. 26 clamp.
Figure 29:
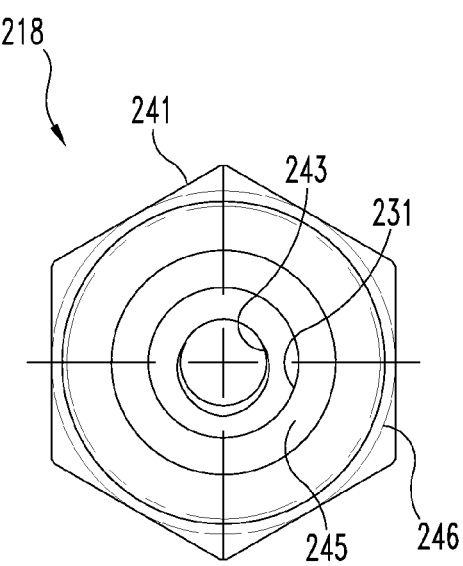
FIG. 29 illustrates a bottom plan view of the FIG. 28 spacer.

Referring now to FIGS. 28-29, an embodiment of spacer 218 is illustrated including wrenching portion 241, internally threaded portion 243, undercut 246, bore 231 and recess 245.

Figure 30:
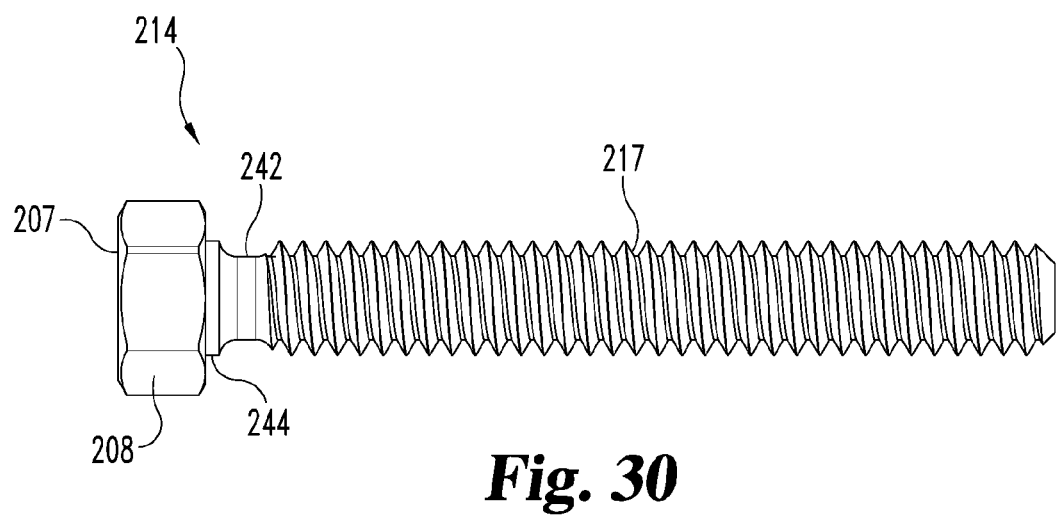
FIG. 30 illustrates a side elevational view of a bolt, a component of the FIG. 26 clamp.

Referring now to FIG. 30, an embodiment of bolt 214 is illustrated including head 207, wrenching portion 208, shoulder 244, undercut 242 and externally threaded portion 217. Shoulder 244 is constructed and arranged to correspond to the thickness and outer diameter of compression spring 247 so that shoulder 244 fits in the ID of compression spring 247 to align the axis of compression spring 247 with the axis of bolt 214.

Referring now to FIGS. 31-36, sequential steps in the installation and removal of clamp 210 in work piece 230 are illustrated. For clarity, only a single work piece 230 is illustrated but it should be understood that work piece 230 would likely comprise two or more work pieces being clamped together by clamp 210. "Two or more work pieces" is diagrammatically represented by the broken line through work piece 230. Clamp 210 is constructed and arranged as a temporary clamping fastener to be used during intermediate assembly steps not in final assemblies. As such, clamp 210 is constructed and arranged for removal after clamping has been completed.

Referring to FIG. 31, clamp 210 is illustrated inserted through aperture 231*a* of work piece 230 with shift washer 128 resting against the top surface and expander 112 positioned on the blind side (surface 233) of work piece 230. As described above in greater detail with respect to the embodiments of clamp 110, installation of clamp 210 is performed by rotating bolt 214 with respect to expander 112. Expander 112 is rotationally constrained with spacer 218, shank 116 and shift washer 128. Shift washer 128 and shank 116 blocked the advancement of flanged end 132 thereby causing thin wall bulbing region 152 to bulb outward and form flange 111 as described above with regard to other embodiments.

Referring now to FIG. 32, a subsequent installation step is illustrated as clamp 210*a*. Clamp 210*a* is illustrated with expander 112 fully bulbed, forming flange 111 and with shift washer 128 fractured with shear segment 129 and shank 116 partly advanced into bore 231 by the advancement of expander 112 up externally threaded portion 217. After flange 111 is formed, continued tightening of bolt 214 with respect to spacer 112 increases the axial load on shift washer 128. At a designed failure load, shank 116 pierces shift washer 128 allowing shank 116 to advance into bore 231.

Referring now to FIG. 33, a subsequent installation step is illustrated as clamp 210*b*. Clamp 210*b* illustrates flange 111 abutting blind side surface 233 with work piece 230 clamped between shift washer 128 and flange 111. Continued rotation of bolt 214 after the failure of shift washer 128 advances shank 116 through bore 231 until flange 111 abuts blind surface 233 and clamps work piece 230 with shank 116 and flanged end 132 substantially filling aperture 231*a*. The installation sequence is terminated when the input torque to bolt 214 is removed. This may result from a clutch or torque limiting device in the installation tool, or via a frangible wrenching region of head 207 that fractures at a designed failure load as described above.

Figure 34:
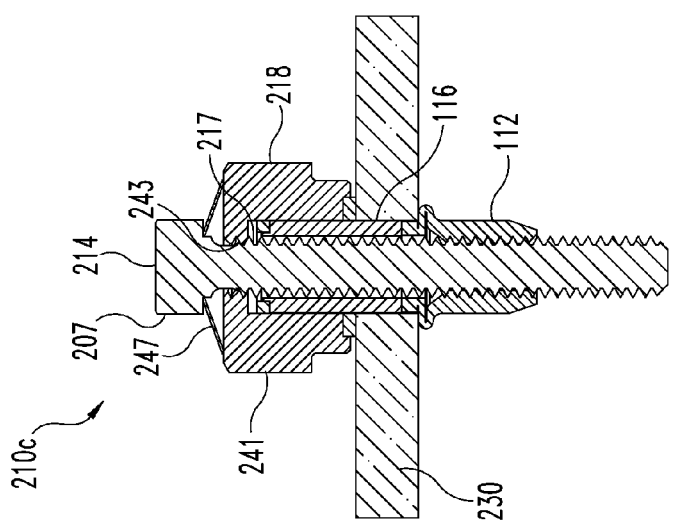
FIG. 34 illustrates a side elevational cross-sectional view of the FIG. 26 clamp in an initial removal configuration.

Referring now to FIG. 34, the initial step to remove clamp 210 is illustrated as clamp 210*c*. Clamp 210*c*, illustrates bolt 214 partially extracted from expander 112. Compression spring 247 has lifted head 207 away from spacer 218 so that internally threaded portion 217 is threadingly engaged with internally threaded portion 243. Expander 112 continues to be engaged with shank 116 and shank 116 is engaged with spacer 218. As described above with regard to other embodiments, shank 116 and/or spacer 218 includes some form of rotational constraint therebetween so that expander 112 is rotationally constrained by rotationally constraining spacer 218, for example, with wrenching portion 241.

Figure 35:
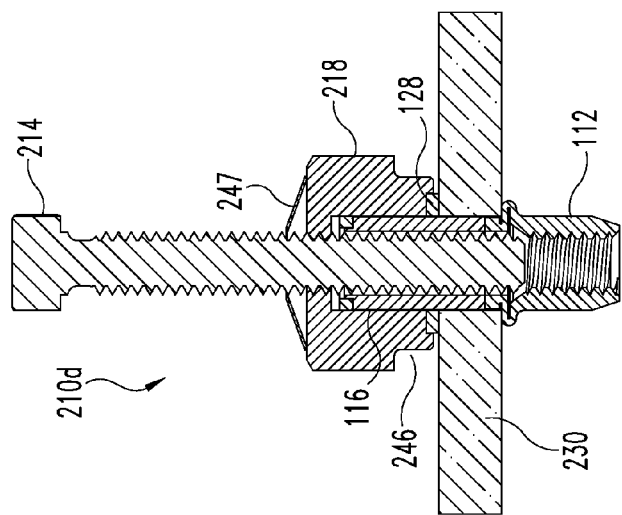
FIG. 35 illustrates a side elevational cross-sectional view of the FIG. 26 clamp in a final removal configuration.

Referring now to FIG. 35, a subsequent removal step is illustrated as clamp 210d. Clamp 210d illustrates bolt 214 engaged with spacer 218 but not expander 112 so that clamp 210d is removable from work piece 230. It is possible to remove bolt 214, spacer 218, shank 116 and shift washer 128 from the front side of work piece 230 leaving expander 112 on the blind side of work piece 230. Undercut 246 optionally facilitates extraction of spacer 218 by robotic equipment.

Figure 36:
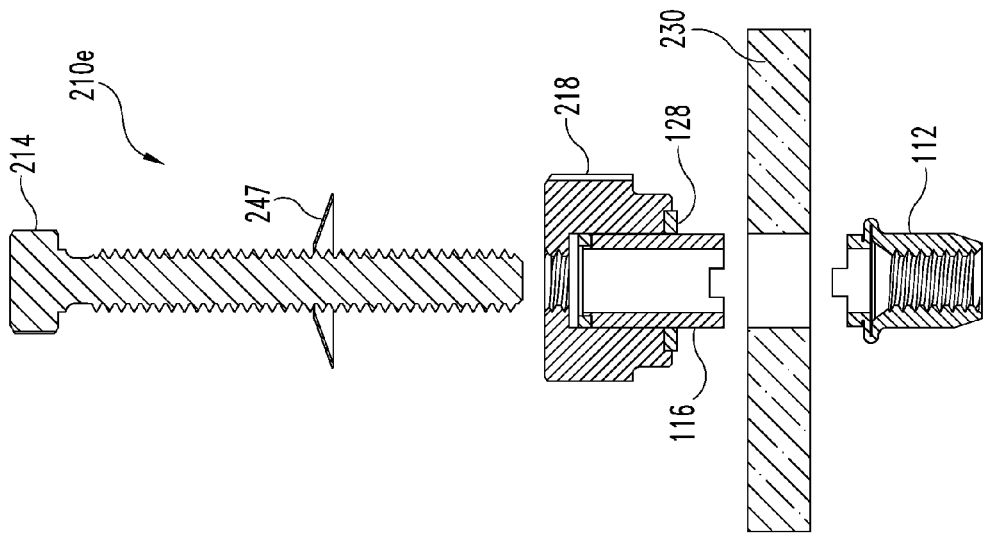
FIG. 36 illustrates an exploded cross-sectional view of the FIG. 26 clamp after installation and removal.

Referring now to FIG. 36, final extraction is illustrated as clamp 210e. Clamp 210e depicts bolt 214 fully unthreaded from spacer 218 and bolt 214, spacer 218 and shank 116 are removed from work piece 230 on the front side with expander 112 removed on the blind side of work piece 230. It will be appreciated by one of ordinary skill in the art that some components of clamp 210e may be recycled for use in a new dual action disposable clamp. In particularly, in some embodiments, bolt 214, compression spring 247, spacer 218 and shank 116 may be reused with shift washer 128 and expander 112 requiring replacement components.

Referring now to FIGS. 37-39, yet another alternative embodiment of a dual-action disposable clamp is illustrated as clamp 310. Clamp 310 includes bolt 314, compression spring 347, spacer 318, shank 316 and expander 112. Bolt 314 includes head 307 having drive recesses 367, undercut 342 and externally threaded portion 317. Spacer 318 includes recess 366, internally threaded portion 343, cross-slots 368, bore 331, extension 361 having outer surface 362 and end 363. As illustrated, bore 331 extends through extension 361. Shank 316 includes boss 329, flange 328, outer surface 364 and flanged end 365. Expander 112 includes internally threaded portion 156, bulbing portion 152 and flanged end 132.

Clamp 310 includes similarities with clamp 210 including the operation of compression springs of 247 and 347 with respect to internally threaded portions 243 and 343 and undercuts 242 and 342. However, spacer 318 and shank 316 include several differences. Extension 361 is configured and arranged so that outer surface 362 fits within the aperture of the work piece with extension 361 extending the length of bore 331 potentially beyond the height above the work piece of spacer 318.

Shank 316 is configured and arranged so that outer surface 364 and boss 329 fit into bore 331 with flange 328 abutting end 363 and flanged end 365 abutting flanged end 132. Flange 328 operates in a similar manner to flange 128 discussed above in that flange 328 prevents shank 316 from advancing into bore 331 until sufficient compressive force has been exerted to bulb bulbing portion 152 as discussed above. Boss 329 fits under extension 361 in bore 331 and provides alignment for spacer 318 as well as rotational constraint of shank 316 to spacer 318. Similarly, flanged end 365 is rotationally constrained with flanged end 132 for example with interlocking key members as discussed above with regard to clamp 10.

Regarding drive recess 367 and cross-slots 368, these are optimized for automated installation. Dual hexagonal wrenching surfaces may be difficult to align with mating hexagonal-recessed tools because the respective phase of the two wrenching surfaces are generally not aligned. The cylindrical body version illustrated in FIGS. 37-39 is comparatively more easily inserted into mating cylindrical cavities in a tool. Engagement with drive recess 367 occurs automatically as the drive portion begins to rotate. The entire fastener then rotates with bolt 314 until restraining pins align with and engage cross-slots 368.

Referring now to FIGS. 40-44, sequential steps in the installation and removal of clamp 310 in work piece 330 are illustrated. Once again, while only a single work piece 310 is illustrated, it should be understood that clamp 310 can be used to clamp multiple work pieces together through aligned apertures. Clamp 310 is constructed and arranged as a temporary clamping fastener used in intermediate assembly steps but not in final assemblies. As such, clamp 310 is constructed and arranged to permit its removal after clamping.

Referring to FIGS. 40-41, clamp 310 is illustrated inserted through aperture 331a of work piece 330 with spacer 318 resting against the top surface of work piece 330, extension 361 extending into aperture 331a and expander 112 positioned on the blind side of work piece 330. Once again, clamp 310 is installed by rotating bolt 314 with respect to expander 112. Expander 112 is rotationally constrained with spacer 318 and shank 316. Flange 328 blocks the advancement of spacer 316 and flanged end 132 thereby causing thin wall bulbing region 152 to bulb outward and form flange 111 as described above with regard to other embodiments.

Referring now to FIG. 42, a subsequent installation step is illustrated as clamp 310a. Clamp 310a illustrated expander 112 fully bulbed, forming flange 111 and flange 328 has fractured permitting shank 316 to advance into bore 331 by the advancement of expander 112 up externally threaded portion 317 so that flange 111 abuts blind side surface 333 with work piece 330 clamped between spacer 318 and flange 111. Note that the combination of extension 361, flanged end 365 and flanged end 132 do not completely fill aperture 331a as there is a gap between end 363 and flanged end 365. The size of the gap between end 363 and flanged end 365 depends on the thickness of work piece 330 compared to the grip range of clamp 331a. The closer to the maximum of the grip range of clamp 331a, the larger the gap.

Figure 43:
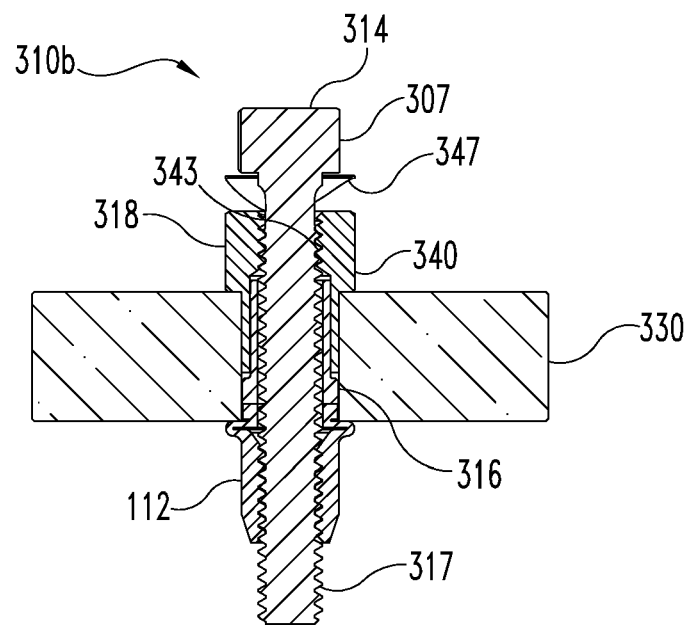
FIG. 43 illustrates a side elevational cross-sectional view of the FIG. 40 clamp in an initial removal configuration.

Referring now to FIG. 43, the initial step to remove clamp 310 is illustrated as clamp 310b. Clamp 310b illustrates bolt 314 partially extracted from expander 112. Compression spring 347 has lifted head 307 away from spacer 318 so that internally threaded portion 317 is threadingly engaged with internally threaded portion 343. Expander 112 continues to be engaged with shank 316 and shank 316 is engaged with spacer 318. As described above with regard to other embodiments, shank 316 and/or spacer 318 includes some form of rotational constraint therebetween so that expander 112 can be rotationally constrained by rotationally constraining spacer 318, for example, with wrenching portion 340.

Figure 44:
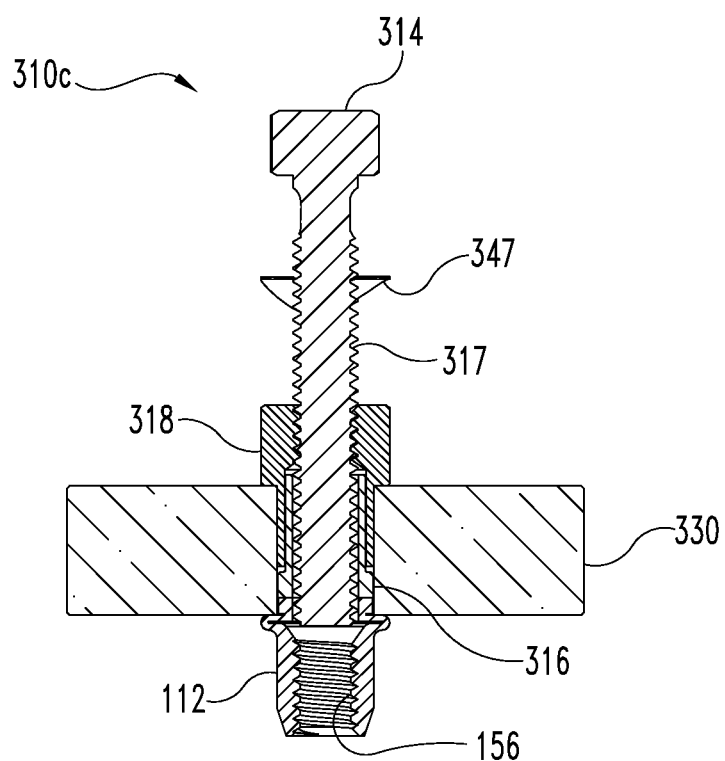
FIG. 44 illustrates a side elevational cross-sectional view of the FIG. 40 clamp in a final removal configuration.

Referring now to FIG. 44, a subsequent removal step is illustrated as clamp 310c. Clamp 310c illustrates bolt 314 engaged with spacer 318 but not expander 112 so that clamp 310c is removable from work piece 330. It is possible to remove bolt 314, spacer 318 and shank 316 from the front side of work piece 330 leaving expander 112 on the blind side of work piece 330.

Flange 28, flange 328 and shift washer 128 are embodiments of a blocking means that prevents shank 16, 116 or 316 from advancing through spacer 18, 118, 218 or 318, respectively, until expander 12 or 112 respectively bulb to form a blind side flange such as flange 111. In alternative embodiments, flange 28 or 328 can be located on spacer 18 or extension 361 respectively. Other embodiments can use other blocking means including, but not limited to, adhesives, internal knurling on spacer 18, 118, 218 or 318, external knurling on shank 16, 116 or 316, welding and protrusions on spacer 18, 118, 218 or 318 or on shank 16, 116 or 316. In alternative embodiments, flange 28 or 328 could be manufactured as a separate component from shank 16 or 316 and the latter positioned on shank 16 or 316 or spacer 18 or 218 or extension 361 using adhesives, welding, heat fit or press fit.

The grip range of clamps 210 and 310 corresponds to the depth of bore 231 and 331, i.e., a deeper bore equates to a larger grip range. However, a deeper bore 231 or 331 requires a taller spacer 218 or 318 respectively which increases the y-axis travel required by robotic installation equipment. A lower profile for more efficient robotic applications is possible by limiting the grip range. In the illustrated embodiments, clamp 210 having an effective one-quarter inch gripping range may have an installed protrusion approximately three-quarters of an inch above the accessible-side of a work piece. Conversely, clamp 310 having an effective one-half inch gripping range may have an installed protrusion approximately three-quarters of an inch above the accessible-side of a work piece. (The "effective" griping ranges cited above include plus or minus one-thirty-second of an inch, i.e., an "extra" one-sixteenth of an inch of grip range.)

Figure 46:
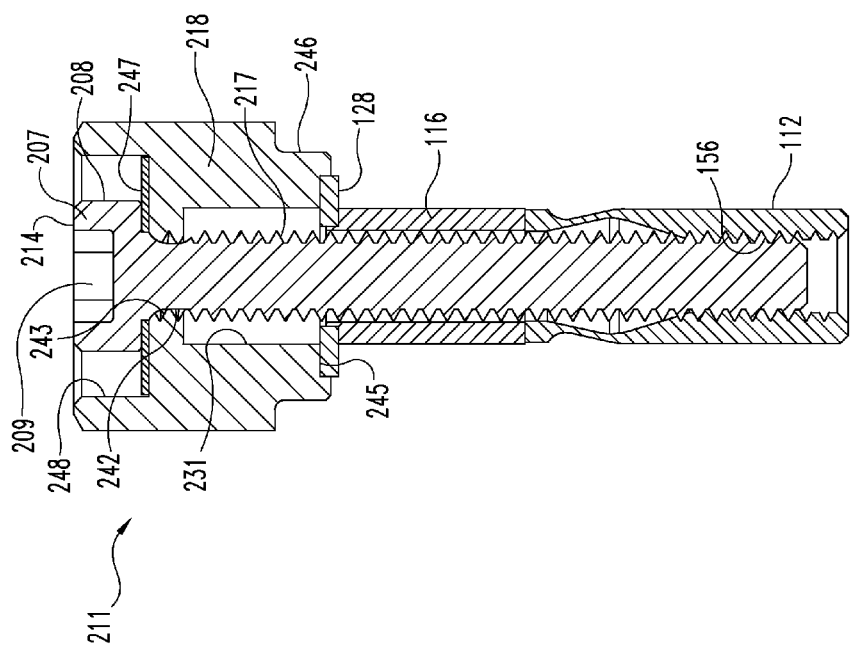
FIG. 46 illustrates a cross-sectional view along line 46-46 of the FIG. 45 clamp.
Figure 45:
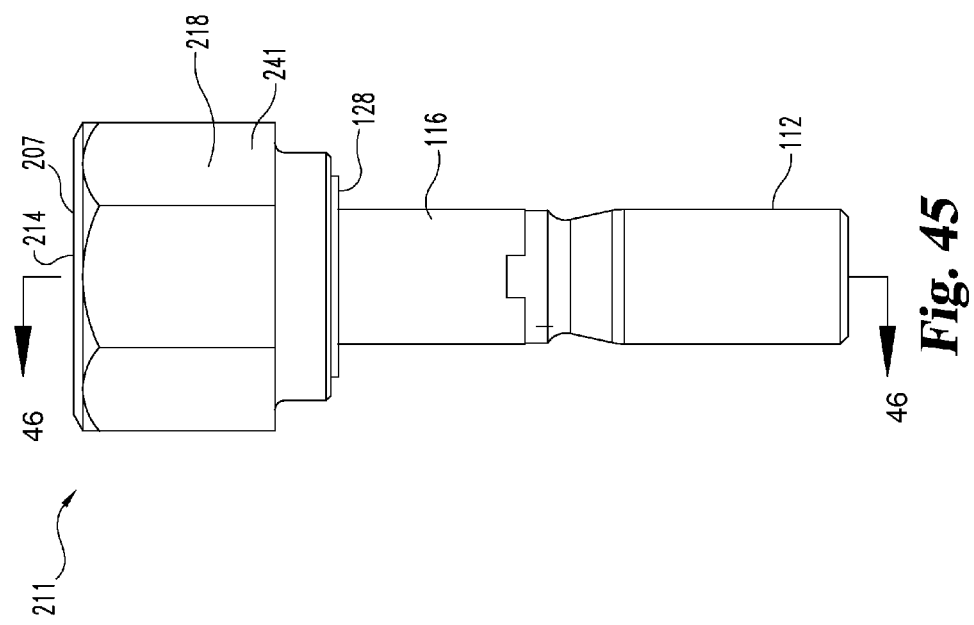
FIG. 45 illustrates a side elevational view of an alternative embodiment of a clamp.

Referring now to FIGS. 45-46, an alternate embodiment of dual action disposal clamp 210 illustrated in FIGS. 26-27 is shown as clamp 211. Similar to claim 210, clamp 211 includes bolt 214, compression spring 247, spacer 218, shift washer 128, shank 116 and expander 112. Bolt 214 includes head 207 having wrenching flats 208, externally threaded portion 217 and undercut 242 between externally threaded portion 217 and head 207. Spacer 218 includes internally threaded portion 243, bore 231, wrenching portion 241, undercut 246 and recess 245. Unlike clamp 210, in clamp 211, head 218 and wrenching portion 241 extend upwardly past compression spring 247 to be closer to the top of core bolt 207 and providing an enlarged external wrenching portion 241 and defining internal wrenching surface 248. In addition, head 207 in clamp 211 includes internal wrenching portion 208. These variations permit additional flexibility in the choice of tools utilized to install and remove clamp 211, permitting two different types of engagement with head 207 and head 218 to secure clamp 211 and provide the relative rotation between bolt 214 and spacer 218. Clamp 211 otherwise is configured to operate in the same way as clamp 210 described above.

It should be understood that "wrenching portions" and "wrenching flats," as used herein, are intended to indicate a feature that can be used to engage a manual or automatic tool, including a cylindrical surface engageable by a one-way clutch or roller clutch. Clamps 10, 110, 210 and 310 disclosed herein can be used in both manual and automated applications. Use of cylindrical surfaces instead of wrenching flats makes it easier to use clamps 10, 110, 210 and 310 with automated installation robots. Conversely, in manual applications, human operators are adapt at adjusting parts as required to fit geometric wrenches, and geometric wrench apparatus are generally less expensive than one-way clutches. Accordingly, other applications lend themselves to the use of conventional wrenching surfaces.

While the disclosure has been illustrated and described in detail in the drawings and foregoing description, the same is to be considered as illustrative and not restrictive in character, it being understood that only the preferred embodiments have been shown and described and that all changes and modifications that come within the spirit of the disclosure are desired to be protected.

I claim:

1. A clamp for clamping a work piece together through an aperture, the work piece having an accessible side and a blind surface, the clamp comprising:
    a spacer comprising a first internally threaded portion and a bore;
    a bolt engaged through said first internally threaded portion and said bore, said bolt comprising a head portion, an externally threaded portion and an intermediate portion therebetween, wherein said first internally threaded portion is constructed and arranged to threadingly engaged said externally threaded portion;
    an expander positioned on said externally threaded portion, said expander comprising first and second end portions, a second internally threaded portion adjacent said second end portion and a bulbing portion between said first and second end portions, wherein said second internally threaded portion is threadingly engaged on said externally threaded portion;
    a shank positioned on said bolt between said spacer and said first end portion, wherein said shank is constructed and arranged to advance through said bore; and
    a blocking means that prevents said shank from advancing through said bore until rotation of said bolt causes said bulbing portion to form a flange, wherein said intermediate portion is constructed and arranged to allow said spacer to be free of threaded engagement with said bolt when said expander is threadingly engaged with said externally threaded portion.

2. The clamp of claim 1, further comprising a compression spring constructed and arranged to bring said externally threaded portion into threading engagement with said first internally threaded portion when rotating said bolt in a loosening direction opposite a tightening direction that causes said bulbing portion to form the flange.

3. The clamp of claim 2, wherein said compression spring is positioned between said head and said spacer.

4. The clamp of claim 2, wherein said compression spring applies a biasing force between said head portion of said bolt and said spacer biasing said head away from said spacer.

5. The clamp of claim 1, wherein an outer diameter of said intermediate portion is less than a minor diameter of said first internally threaded portion.

6. The clamp of claim 1, wherein a longitudinal length of said intermediate portion is greater than a longitudinal length of said first internal threaded portion.

7. The clamp of claim 1, wherein, after the flange is formed, continued rotation of said bolt completes the clamp by drawing the flange into a clamping position against the blind surface.

8. The clamp of claim 1, wherein said spacer further comprises an extension constructed and arranged to extend into the aperture and wherein said bore extends through said extension.

9. The clamp of claim 1, wherein said spacer and said end portion are constructed and arranged to substantially fill the aperture when the clamp is complete.

10. The clamp of claim 1, wherein said expander further comprises a transition portion defining a groove in the outer surface of said expander positioned between said first end portion and said bulbing portion that forms a non-canted transition between the flange and said first end portion when said bulbing portion forms the flange.

11. The clamp of claim 1, wherein said blocking means is a shift washer positioned between said shank and said spacer.

12. The clamp of claim 1, wherein said blocking means is a flange on said shank.

13. The clamp of claim 1, wherein said blocking means is a flange in said bore.

14. The clamp of claim 1, wherein the clamp is constructed and arranged to form the flange without applying an initial clamping force to the work piece.

15. The clamp of claim 1, wherein said spacer is free of threaded engagement with said bolt when said bulbing portion forms the flange.

16. The clamp of claim 1, wherein said spacer is free of threaded engagement with said bolt before said bulbling portion forms the flange.

17. A method for removing a clamp from a work piece, the work piece having an accessible side and a blind side, the method comprising the acts of:
- restraining a spacer with a first internally threaded portion and a bore from rotating and thereby rotationally restraining a shank and an expander, wherein the expander includes a second internally threaded portion that is threadingly engaged with an externally threaded portion of a bolt with the first internally threaded portion of the spacer positioned over an intermediate portion of the bolt between a head of the bolt and an externally threaded portion of the bolt such that the first internally threaded portion is free of threaded engagement with the externally threaded portion;
- rotating the bolt in a loosening direction while axially moving the bolt with respect to the spacer thereby threadingly engaging the externally threaded portion of the bolt with the first internally threaded portion of the spacer, wherein rotation in the loosening direction is opposite to rotation in a tightening direction that caused a bulbling portion on the expander to form a flange between an end portion of the expander and the second internally threaded portion and further caused the shank positioned on the bolt between the spacer and the end portion of the expander to advance through the spacer past a blocking means that prevents the shank from advancing through the spacer until rotation of the bolt in the tightening direction causes the bulbing portion of the expander to form a flange;
- subsequent the moving act, continued rotating the bolt in a loosening direction thereby unthreading the core bolt from the expander while rotationally restraining the expander and the spacer; and
- subsequent to the unthreading act, removing the clamp from the work piece by removing the bolt, the spacer, and the shank from the accessible side and removing the expander from the blind side.

18. The method of claim 17, wherein the moving act includes releasing energy stored in a compression spring positioned between a head of the bolt and the space to axially move the bolt with respect to the spacer.

19. A clamp for clamping a work piece together through an aperture, the work piece having an accessible side and a blind surface, the clamp comprising:
- a spacer comprising a first internally threaded portion and a bore;
- a bolt disposed through said first internally threaded portion and said bore, said bolt comprising a head portion, an externally threaded portion and an intermediate portion therebetween, wherein said first internally threaded portion is constructed and arranged to threadingly engage with said externally threaded portion;
- an expander positioned on said bolt, said expander comprising an end portion, a second internally threaded portion and a bulbing portion positioned therebetween, wherein said second internally threaded portion is threadingly engaged on said externally threaded portion, wherein said intermediate portion is constructed and arranged so that said spacer is free of threaded engagement with said bolt when said bolt is threadingly engaged with said expander prior to clamping;
- a shank positioned on said bolt between said spacer and said end portion, wherein said shank is constructed and arranged to advance through said bore; and
- a shift washer positioned between said shank and said spacer that prevents said shank from advancing through said bore until rotation of said bolt in a tightening direction causes said bulbing portion to form a flange; and
- a compression spring constructed an arranged to bring said externally threaded portion into threaded engagement with said first internally threaded portion when rotating said bolt in a loosening direction opposite the tightening direction.

20. The clamp of claim 19, wherein an outer diameter of said intermediate portion is less than a minor diameter of said first internally threaded portion.

21. The clamp of claim 19, wherein a longitudinal length of said intermediate portion is greater than a longitudinal length of said first internal threaded portion.

22. The clamp of claim 19, wherein said spacer further comprises an extension constructed and arranged to extend into the aperture and wherein said bore extends through said extension.

23. The clamp of claim 19, wherein said spacer and said end portion are constructed and arranged to substantially fill the aperture when the clamp is complete.

24. The clamp of claim 19, wherein said intermediate portion is an undercut.

25. The clamp of claim 19, wherein spacer is free of threaded engagement with said bolt during the clamping operation.

26. The clamp of claim 19, wherein said spacer is threadingly engaged with said bolt during removal of said bolt from the clamp.

* * * * *

UNITED STATES PATENT AND TRADEMARK OFFICE
CERTIFICATE OF CORRECTION

| | | |
|---|---|---|
| PATENT NO. | : 8,398,345 B2 | Page 1 of 1 |
| APPLICATION NO. | : 12/843465 | |
| DATED | : March 19, 2013 | |
| INVENTOR(S) | : John D. Pratt | |

It is certified that error appears in the above-identified patent and that said Letters Patent is hereby corrected as shown below:

In the Specifications:

In column 1, line 5, replace "PCT/2010/04317" with --PCT/US2010/042317--.
In column 1, line 11, replace "2007" with --2008--.

Signed and Sealed this
Twenty-first Day of May, 2013

Teresa Stanek Rea
*Acting Director of the United States Patent and Trademark Office*